(12) United States Patent
Lim

(10) Patent No.: US 12,155,299 B2
(45) Date of Patent: *Nov. 26, 2024

(54) HYBRID POWER CONVERTER WITH TWO-PHASE CONTROL OF FLYING CAPACITOR BALANCING

(71) Applicant: Cirrus Logic International Semiconductor Ltd., Edinburgh (GB)

(72) Inventor: Changjong Lim, Seoul (KR)

(73) Assignee: Cirrus Logic Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,723

(22) Filed: Feb. 27, 2024

(65) Prior Publication Data

US 2024/0204662 A1 Jun. 20, 2024

Related U.S. Application Data

(63) Continuation of application No. 17/707,092, filed on Mar. 29, 2022, now Pat. No. 11,949,332.

(51) Int. Cl.
*H02M 3/07* (2006.01)
*H02M 1/00* (2006.01)

(52) U.S. Cl.
CPC .......... *H02M 3/07* (2013.01); *H02M 1/0095* (2021.05)

(58) Field of Classification Search
CPC ........ H02M 7/06; H02M 1/0009; H02M 1/44; H02M 3/07; H02M 1/0095; H02M 3/158; H02M 3/15486

See application file for complete search history.

(56) References Cited

U.S. PATENT DOCUMENTS 11,228,256 B2 * 1/2022 Zilio .................. H02M 1/0095
11,303,205 B2 4/2022 Giuliano
(Continued)

FOREIGN PATENT DOCUMENTS

EP 3214749 A1 9/2017

OTHER PUBLICATIONS

International Search Report and Written Opinion of the International Searching Authority, International Application No. PCT/GB2023/050355, mailed May 17, 2023.

*Primary Examiner* — Adolf D Berhane
(74) *Attorney, Agent, or Firm* — Jackson Walker L.L.P.

(57) ABSTRACT

A power converter for converting an input voltage at an input of the power converter into an output voltage at an output of the power converter may include a first power converter branch comprising a first capacitor, a first switch network, and a first inductor, the first switch network arranged to selectably couple the first capacitor between an input voltage, a first reference voltage, and a first terminal of the first inductor, wherein a second terminal of the first inductor is coupled to an output node; a second power converter branch comprising a second capacitor, a second switch network, and a second inductor, the second switch network arranged to selectably couple the second capacitor between the input voltage, a second reference voltage, and a first terminal of the second inductor, wherein a second terminal of the second inductor is coupled to the output node; and a third switch network between the first power converter branch and the second power converter branch, wherein the third switch network is arranged to selectably couple the first and second capacitors in series or in parallel, to allow enable charge balancing between the first capacitor and second capacitor.

11 Claims, 46 Drawing Sheets

(56) References Cited

U.S. PATENT DOCUMENTS

| | | |
|---|---|---|
| 11,637,491 B2 | 4/2023 | Petersen |
| 11,646,665 B2 * | 5/2023 | Wu .................... H02M 1/0045 327/109 |
| 11,855,531 B2 * | 12/2023 | Lim .................... H02M 1/0095 |
| 11,949,332 B2 * | 4/2024 | Lim .................... H02M 3/158 |
| 2019/0334433 A1 | 10/2019 | Woo |
| 2021/0313891 A1 | 10/2021 | Chakraborty |

* cited by examiner

ND_POWER_CONVERTER_WITH
HYBRID POWER CONVERTER WITH TWO-PHASE CONTROL OF FLYING CAPACITOR BALANCING

The present disclosure is a continuation of U.S. Nonprovisional patent application Ser. No. 17/707,092, filed Mar. 29, 2022, which is incorporated by reference herein in its entirety.

FIELD OF DISCLOSURE

The present disclosure relates in general to circuits for electronic devices, including without limitation personal audio devices such as wireless telephones and media players, and more specifically, to a hybrid buck-boost power converter implemented in a 3-level buck-boost topology that enables the hybrid power converter to operate in a plurality of operating modes. In particular, the hybrid power converter disclosed herein supports operation in both buck modes of operation and boost modes of operation, rendering it suitable not only for battery charging in applications that typically employ single-series-cell batteries (e.g., mobile phones and other small portable devices), but also for applications that typically employ multiple-series-cell batteries (e.g., notebook computers). Further, the hybrid power converter disclosed herein supports two-phase operation, including two-phase control balancing of flying capacitors of the two converter phases.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones or one or more speakers. Such circuitry often includes a speaker driver including a power amplifier for driving an audio output signal to headphones or speakers. Oftentimes, a power converter may be used to provide a supply voltage to a power amplifier in order to amplify a signal driven to speakers, headphones, or other transducers. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier. A power converter may be used to provide supply voltage rails to one or more components in a device. A power converter may also be used in other applications besides driving audio transducers, such as driving haptic actuators or other electrical or electronic loads. Further, a power converter may also be used in charging a battery from a source of electrical energy (e.g., an AC-to-DC adapter).

In many instances, the type of power converter needed may depend on the device powered by the battery. For example, mobile phones and small portable devices may utilize a single-cell (e.g., "1s") or two-series-cell (e.g., "2s") battery, while notebook or laptop computers may utilize a two-series-cell or four-series-cell (e.g., "4s") battery. In a battery employing two or more series cells, it may be necessary to support both buck modes and boost modes of operation within the same power converter.

One type of power converter often used in electronic circuits is a 3-level buck converter. FIG. 1 depicts an example two-phase 3-level buck converter 100, as is known in the art. As shown in FIG. 1, 3-level buck converter 100 may include an input configured to receive an input voltage $V_{IN}$ and an output configured to generate an output voltage VOLT. Further, a first phase 101a of 3-level buck converter 100 may include a switching node having a voltage $L_{xa}$ and a second phase 101b of 3-level buck converter 100 may include a switching node having a voltage $L_{xb}$. Each phase 101 may include a power inductor 102 (e.g., power inductor 102a, 102b) coupled between the switching node and the output. Moreover, each phase 101 may include a flying capacitor 104 (e.g., flying capacitor 104a, 104b) having a first capacitor terminal and a second capacitor terminal. In addition, each phase may include a plurality of switches 106-1 (e.g., switches 106-1a, 106-1b), 106-2 (e.g., switches 106-2a, 106-2b), 106-3 (e.g., switches 106-3a, 106-3b), and 106-4 (e.g., switches 106-4a, 106-4b), wherein switch 106-1 is coupled between the input and the first capacitor terminal, switch 106-2 is coupled between the first capacitor terminal and the switching node, switch 106-3 is coupled between the second capacitor terminal and the switching node, and switch 106-4 is coupled between the second capacitor terminal and a ground voltage.

In operation, switches 106 may be controlled to regulate output voltage $V_{OUT}$ to a desired target voltage. As shown in FIGS. 2A and 2B, buck operation of a phase 101 may include cyclic, periodic commutation of switches 106 among a first state ($\varphi 1$), a second state ($\varphi 2$), a third state ($\varphi 3$), and a fourth state ($\varphi 4$). As shown in FIG. 2A, for duty cycles of less than 0.5, switches 106-1 and 106-3 may be activated (and switches 106-2 and 106-4 deactivated) during the first state, switches 106-3 and 106-4 may be activated (and switches 106-1 and 106-2 may be deactivated) during the second state, switches 106-1, 106-2, and 106-4 may be activated (and switch 106-3 may be deactivated) during the third state, and switches 106-3 and 106-4 may be activated (and switches 106-1 and 106-2 may be deactivated) during the fourth state. Further, as shown in FIG. 2B, for duty cycles of less than 0.5, switches 106-1 and 106-2 may be activated (and switches 106-3 and 106-4 deactivated) during the first state, switches 106-1 and 106-3 may be activated (and switches 106-2 and 106-4 may be deactivated) during the second state, switches 106-1 and 106-2 may be activated (and switches 106-3 and 106-4 may be deactivated) during the third state, and switches 106-2 and 106-4 may be activated (and switches 106-1 and 106-3 may be deactivated) during the fourth state. FIGS. 3A and 3B and FIGS. 4A and 4B depict general two-phase operation waveforms illustrating the switching operation described above.

Two-phase 3-level buck converter 100 may have advantages, including minimized ripple of output voltage $V_{OUT}$ by having the two phases operate with a 180-degree phase shift and increased current capability as compared to a single-phase operation. However, two-phase 3-level buck converter 100 cannot support a hybrid mode of operation. In particular, two-phase 3-level buck converter 100 cannot support a forward boost mode of operation. However, situations may exist in which it may be desirable to regulate output voltage $V_{OUT}$ to a voltage above $2V_{IN}$, which is not possible with the topology shown in FIG. 1. In addition, the topology shown in FIG. 1 does not include a mechanism to balance charge between flying capacitors 104a and 104b.

SUMMARY

In accordance with the teachings of the present disclosure, one or more disadvantages and problems associated with existing topologies for hybrid 3-level buck-boost converters may be reduced or eliminated.

In accordance with embodiments of the present disclosure, a power converter for converting an input voltage at an input of the power converter into an output voltage at an output of the power converter may include a plurality of phases and balancing switching. The plurality of phases may include at least a first phase and a second phase, wherein each of the plurality of phases includes a switching node, a power inductor coupled between the switching node and the output, a flying capacitor having a first flying capacitor terminal and a second flying capacitor terminal, a pump capacitor having a first pump capacitor terminal and a second pump capacitor terminal, the second pump capacitor terminal coupled to ground, a first switch coupled between the input and the first flying capacitor terminal, a second switch coupled between the first flying capacitor terminal and the switching node, a third switch coupled between the second flying capacitor terminal and the switching node, and a fourth switch coupled between the second flying capacitor terminal and a ground voltage. The balancing switches comprise a fifth switch coupled between the second capacitor terminal of the first phase and the first capacitor terminal of the second phase, a sixth switch coupled between the first capacitor terminal of the second phase and the first capacitor terminal of the second phase, a seventh switch coupled between the first capacitor terminal of the first phase and the first capacitor terminal of the second phase, and an eighth switch coupled between the second capacitor terminal of the first phase and the second capacitor terminal of the second phase.

In accordance with these and other embodiments of the present disclosure, a method for converting an input voltage at an input of the power converter into an output voltage at an output of the power converter may be provided. The power converter may include a plurality of phases and balancing switches. The plurality of phases may include at least a first phase and a second phase, each of the plurality of phases comprising a switching node, a power inductor coupled between the switching node and the output, a flying capacitor having a first flying capacitor terminal and a second flying capacitor terminal, a pump capacitor having a first pump capacitor terminal and a second pump capacitor terminal, the second pump capacitor terminal coupled to ground, a first switch coupled between the input and the first flying capacitor terminal, a second switch coupled between the first flying capacitor terminal and the switching node, a third switch coupled between the second flying capacitor terminal and the switching node, and a fourth switch coupled between the second flying capacitor terminal and a ground voltage. The balancing switches may include a fifth switch coupled between the second capacitor terminal of the first phase and the first capacitor terminal of the second phase, a sixth switch coupled between the first capacitor terminal of the second phase and the first capacitor terminal of the second phase, a seventh switch coupled between the first capacitor terminal of the first phase and the first capacitor terminal of the second phase, and an eighth switch coupled between the second capacitor terminal of the first phase and the second capacitor terminal of the second phase. The method may include operating the power converter in a forward 3-level buck mode having a plurality of switching states, wherein: for at least a first one of the plurality of switching states, the fifth switch is activated to couple the flying capacitor of the first phase and the flying capacitor of the second phase in series; for at least a second one of the plurality of switching states, the sixth switch is activated to couple the flying capacitor of the first phase and the flying capacitor of the second phase in series; and for at least a third one of the plurality of switching states, one of the seventh switch and the eighth switch is activated to couple the flying capacitor of the first phase and the flying capacitor of the second phase in parallel.

In accordance with these and other embodiments of the present disclosure, an integrated circuit for use in a power converter for converting an input voltage at an input of the integrated circuit into an output voltage at an output of the power converter may include a plurality of phases and balancing switches. The plurality of phases may include at least a first phase and a second phase, each of the plurality of phases comprising a switching node, a first switch coupled between the input and a first node configured to couple to a first flying capacitor terminal of a flying capacitor, a second switch coupled between the first node and the switching node, a third switch coupled between the switching node and a second flying capacitor terminal of the flying capacitor, and a fourth switch coupled between the second node and a third node at a ground voltage. The balancing switches may include a fifth switch coupled between the second node of the first phase and the first node of the second phase, a sixth switch coupled between the first node of the second phase and the first node of the second phase, a seventh switch coupled between the first node of the first phase and the first node of the second phase, and an eighth switch coupled between the second node of the first phase and the second node of the second phase.

In accordance with these and other embodiments of the present disclosure, a power converter for converting an input voltage at an input of the power converter into an output voltage at an output of the power converter may include a first power converter branch comprising a first capacitor, a first switch network, and a first inductor, the first switch network arranged to selectably couple the first capacitor between an input voltage, a first reference voltage, and a first terminal of the first inductor, wherein a second terminal of the first inductor is coupled to an output node; a second power converter branch comprising a second capacitor, a second switch network, and a second inductor, the second switch network arranged to selectably couple the second capacitor between the input voltage, a second reference voltage, and a first terminal of the second inductor, wherein a second terminal of the second inductor is coupled to the output node; and a third switch network between the first power converter branch and the second power converter branch, wherein the third switch network is arranged to selectably couple the first and second capacitors in series or in parallel, to allow enable charge balancing between the first capacitor and second capacitor.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 5:
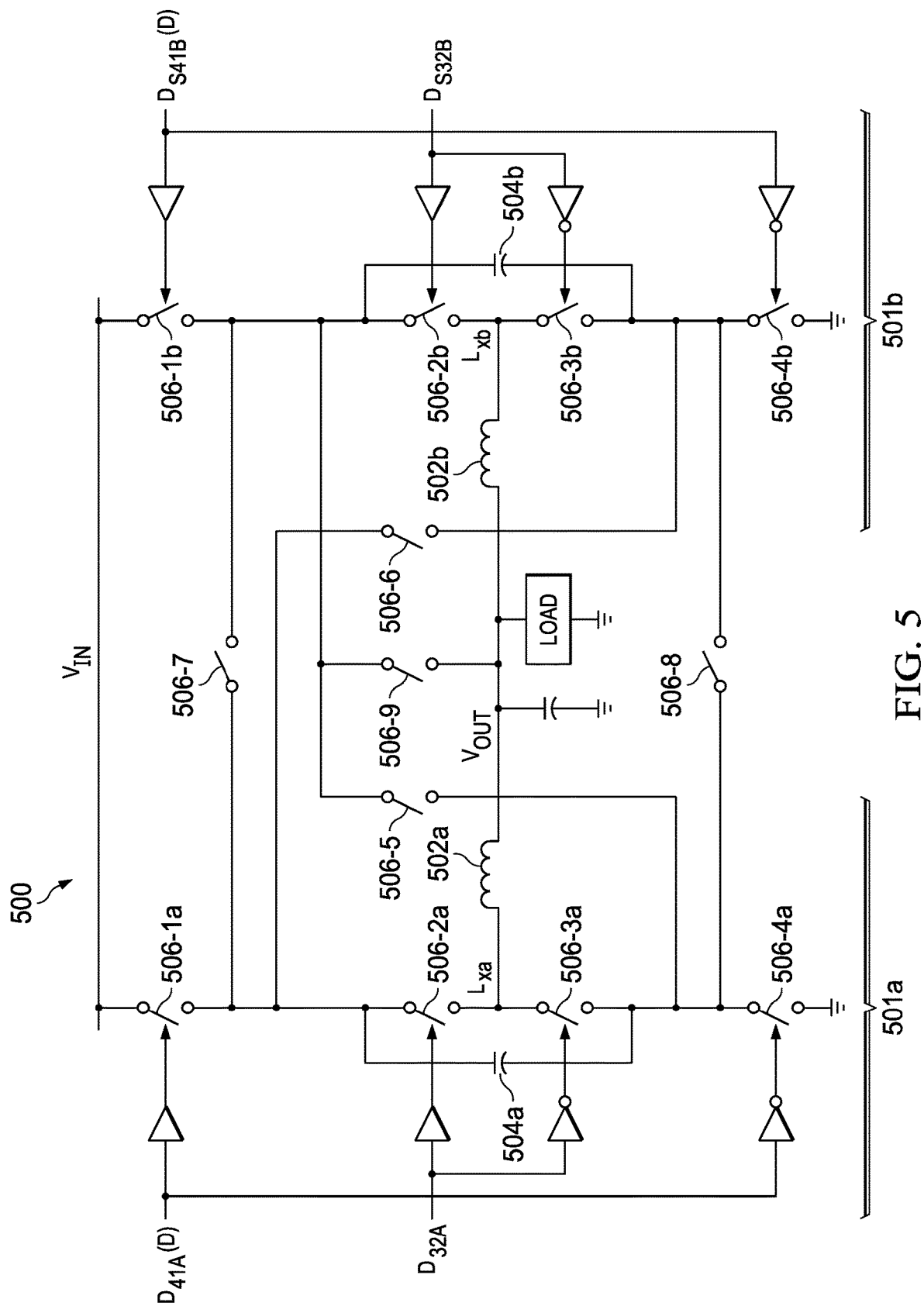
FIG. 5 illustrates a circuit diagram of selected components of an example two-phase hybrid 3-level power converter, in accordance with embodiments of the present disclosure.

FIG. 5 illustrates a circuit diagram of selected components of an example two-phase hybrid 3-level power converter 500, in accordance with embodiments of the present disclosure. As shown in FIG. 5, two-phase hybrid 3-level power converter 500 may include an input configured to receive an input voltage $V_{IN}$ and an output configured to generate an output voltage VOLT. Further, a first phase 501a of two-phase hybrid 3-level power converter 500 may include a switching node having a voltage $L_{xa}$ and a second phase 501b of two-phase hybrid 3-level power converter 500 may include a switching node having a voltage $L_{xb}$. Each phase 501 may include a power inductor 502 (e.g., power inductor 502a, 502b) coupled between the switching node and the output. Moreover, each phase 501 may include a flying capacitor 504 (e.g., flying capacitor 504a, 504b) having a first capacitor terminal and a second capacitor terminal. In addition, each phase may include a plurality of switches 506-1 (e.g., switches 506-1a, 506-1b), 506-2 (e.g., switches 506-2a, 506-2b), 506-3 (e.g., switches 506-3a, 506-3b), and 506-4 (e.g., switches 506-4a, 506-4b), wherein switch 506-1 is coupled between the input and the first capacitor terminal, switch 506-2 is coupled between the first capacitor terminal and the switching node, switch 506-3 is coupled between the second capacitor terminal and the switching node, and switch 506-4 is coupled between the second capacitor terminal and a ground voltage.

In addition, two-phase hybrid 3-level power converter 500 may include a switch 506-5 coupled between the second capacitor terminal of phase 501a and the first capacitor terminal of phase 501b, a switch 506-6 coupled between the first capacitor terminal of phase 501a and the second capacitor terminal of phase 501b, a switch 506-7 coupled between the first capacitor terminal of phase 501a and the first capacitor terminal of phase 501b, a switch 506-8 coupled between the second capacitor terminal of phase 501a and the second capacitor terminal of phase 501b, and a switch 506-9 coupled between the first capacitor terminal of phase 501a and the output of two-phase hybrid 3-level power converter 500. In operation, as described in greater detail below, switches 506-5, 506-6, 506-7, and 506-8 may enable balancing between flying capacitors 504a and 504b, and switch 506-9 may enable boost operation. In particular, switches 506-5, 506-6, 506-7, and 506-8 may be controlled to place flying capacitors 504a and 504b in series or in parallel with one another in order to support charge balancing between flying capacitors 504a and 504b at a voltage of $V_{IN}/2$, similar in operation to a 2:1 switched capacitor.

For example, FIGS. 6A-6J depict possible configurations of switches 506 in a two-phase 3-level buck configuration, in accordance with embodiments of the present disclosure. In operation, phase 501a and 501b may operate with a 180-degree phase shift with respect to one another, in order to minimize ripple on output voltage $V_{OUT}$. Using this 180-degree phase shift, a balancing sequence to balance flying capacitors 504 and 504b may be implemented using balancing switches 506-5, 506-6, 506-7, and 506-8. A balancing switch 506-5, 506-6, 506-7, or 506-8 may be activated during one or more durations of a switching cycle of two-phase hybrid 3-level power converter 500 and deactivated during the remaining durations of the switching cycle.

Figure 6A:
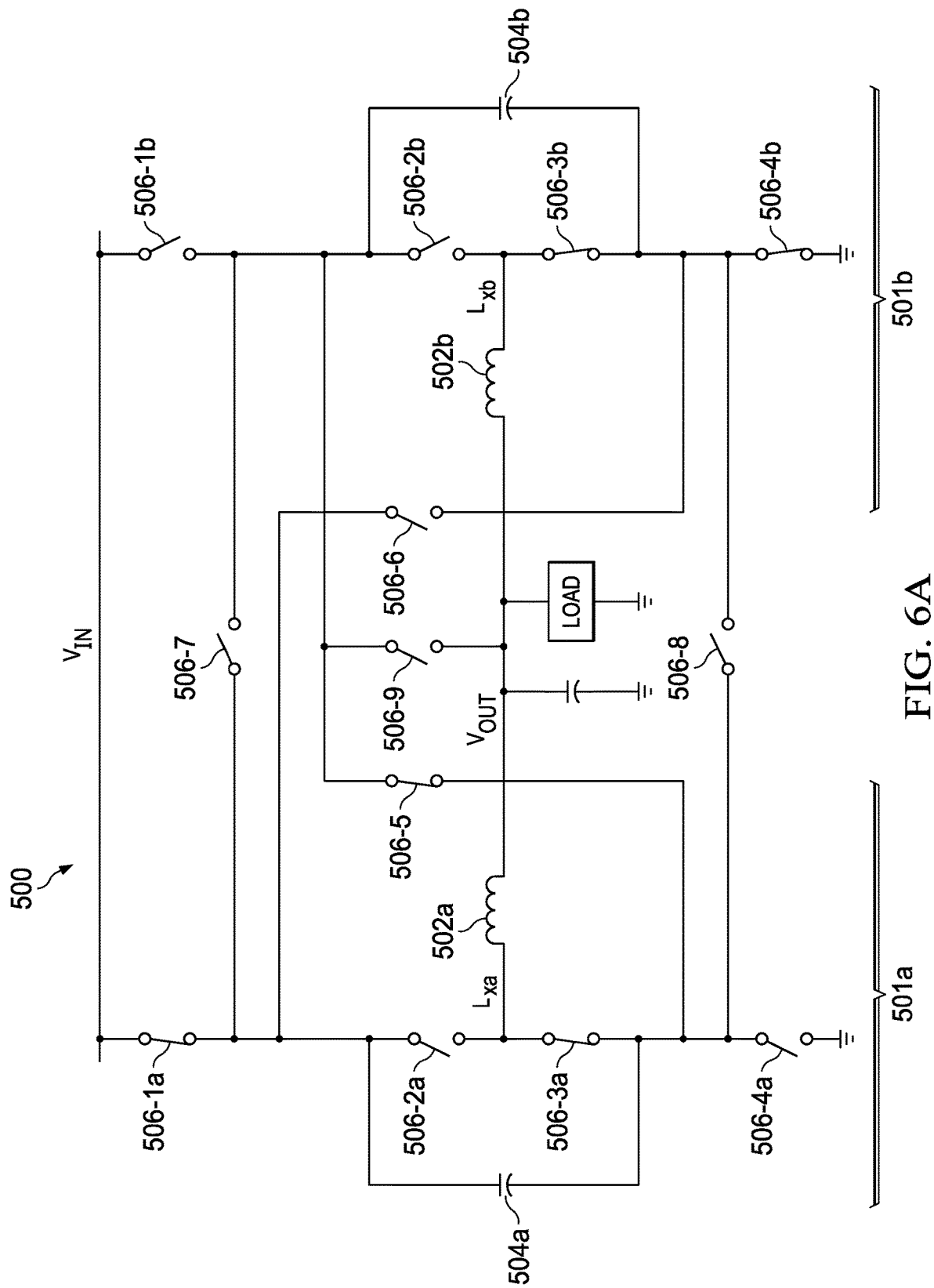
FIGS. 6A-6J illustrate circuit diagrams of example switching configurations of the two-phase hybrid 3-level power converter shown in FIG. 5, in accordance with embodiments of the present disclosure.
Figure 6B:
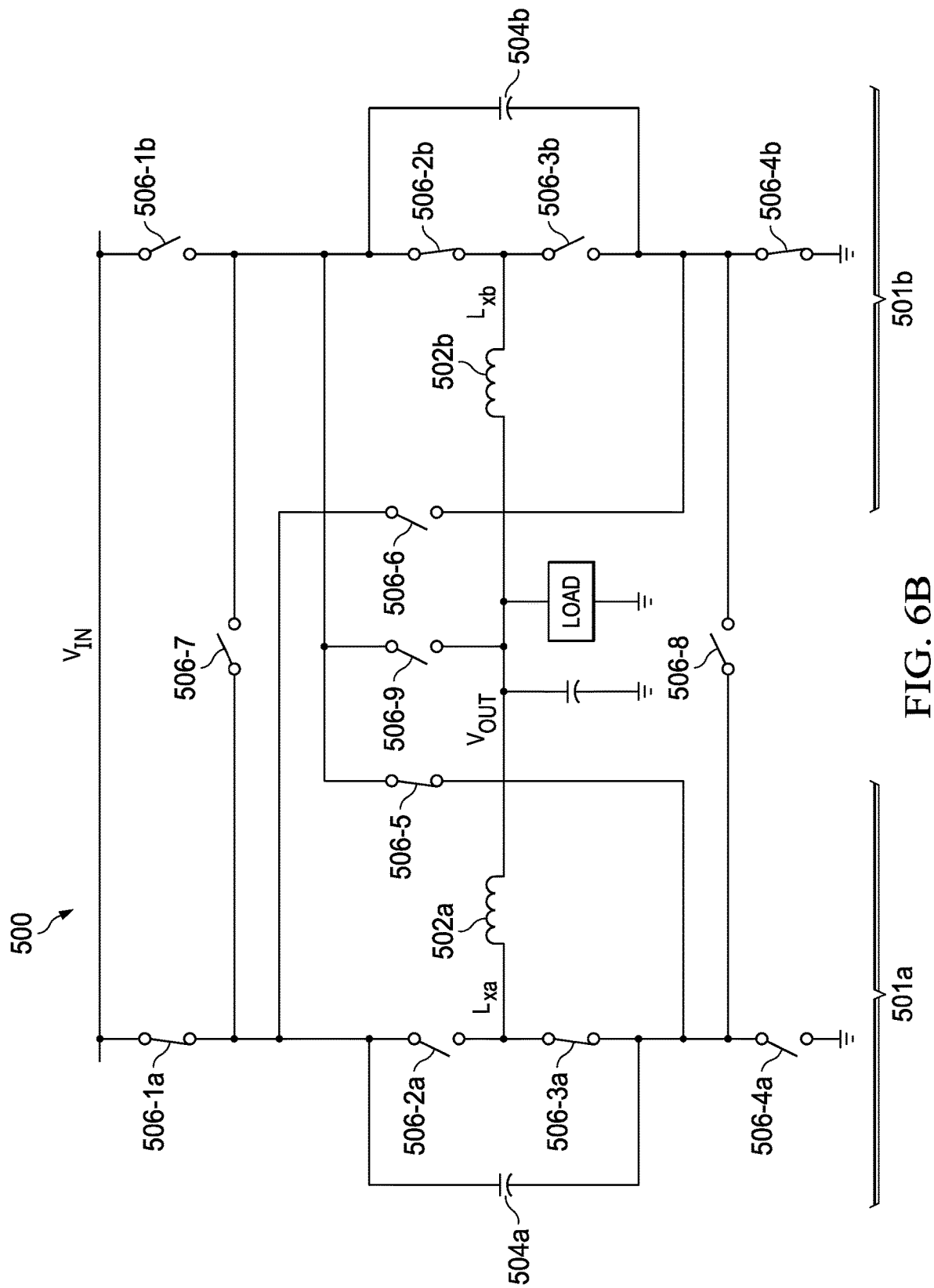

For example, as is shown in FIGS. 6A and 6B, balancing switch 506-5 may be activated during one or more switching states of two-phase hybrid 3-level power converter 500 such that flying capacitors 504a and 504b are placed in series with flying capacitor 504a coupled to input voltage $V_{IN}$ and flying capacitor 504b coupled to a ground voltage. Although FIGS. 6A and 6B depict two switching states in which flying capacitors 504a and 504b are placed in series via balancing switch 506-5, other switching states of two-phase hybrid 3-level power converter 500 in which flying capacitors 504a and 504b are placed in series via balancing switch 506-5 may be utilized.

Figure 6C:
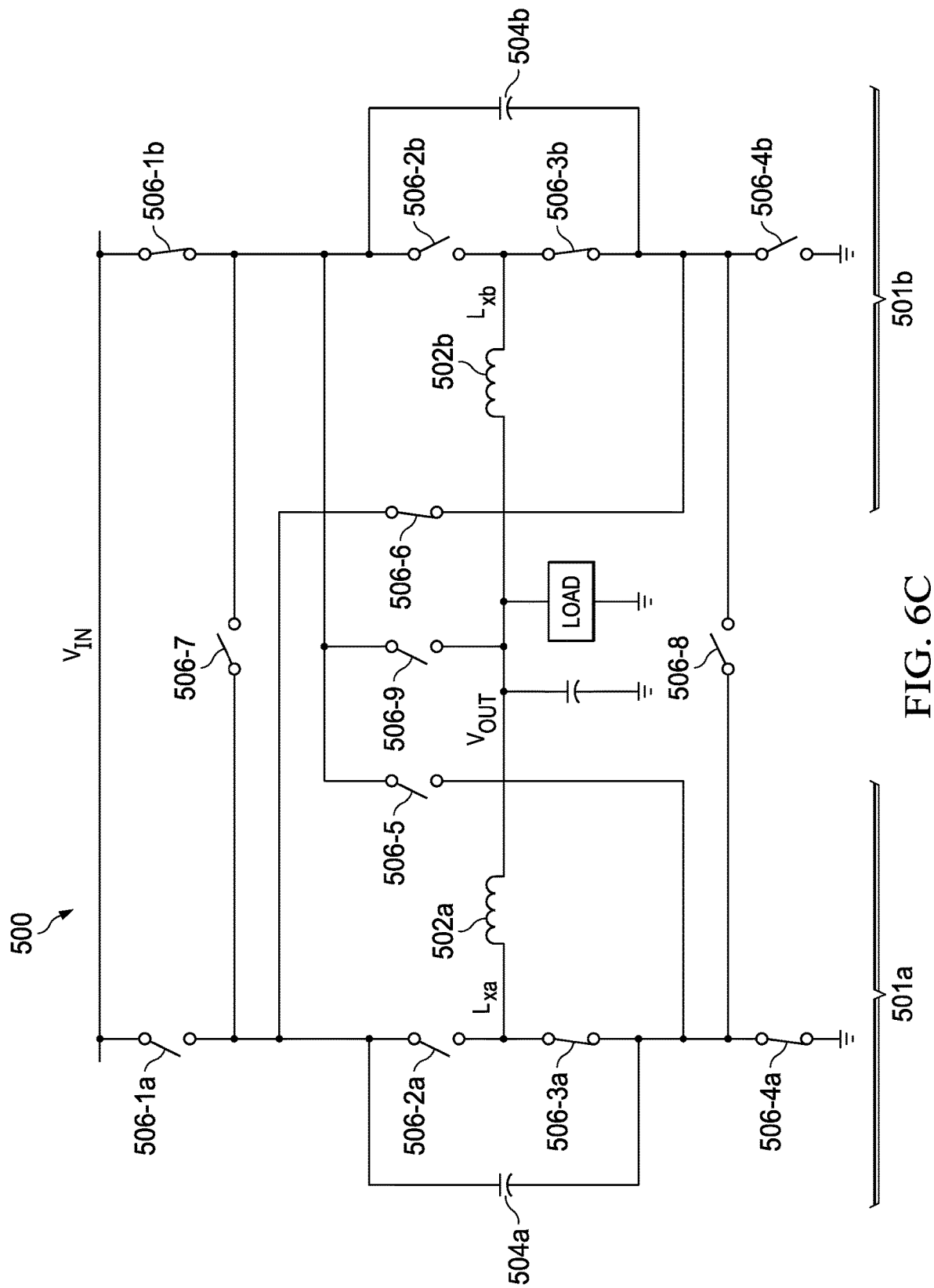
Figure 6D:
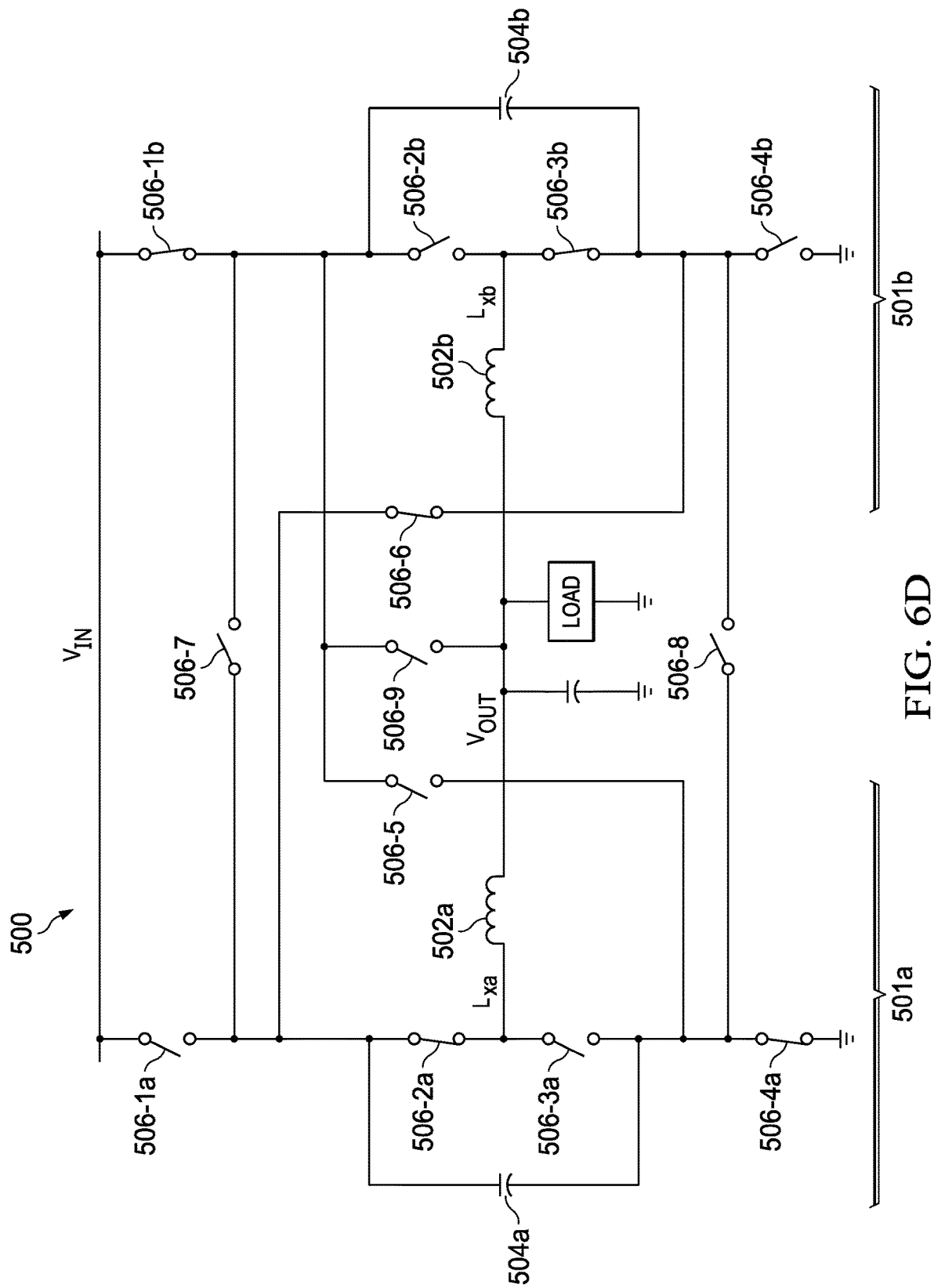

As another example, as is shown in FIGS. 6C and 6D, balancing switch 506-6 may be activated during one or more switching states of two-phase hybrid 3-level power converter 500 such that flying capacitors 504a and 504b are placed in series with flying capacitor 504b coupled to input voltage $V_{IN}$ and flying capacitor 504a coupled to the ground voltage. Although FIGS. 6C and 6D depict two switching states in which flying capacitors 504a and 504b are placed in series via balancing switch 506-6, other switching states of two-phase hybrid 3-level power converter 500 in which flying capacitors 504a and 504b are placed in series via balancing switch 506-6 may be utilized.

Figure 6E:
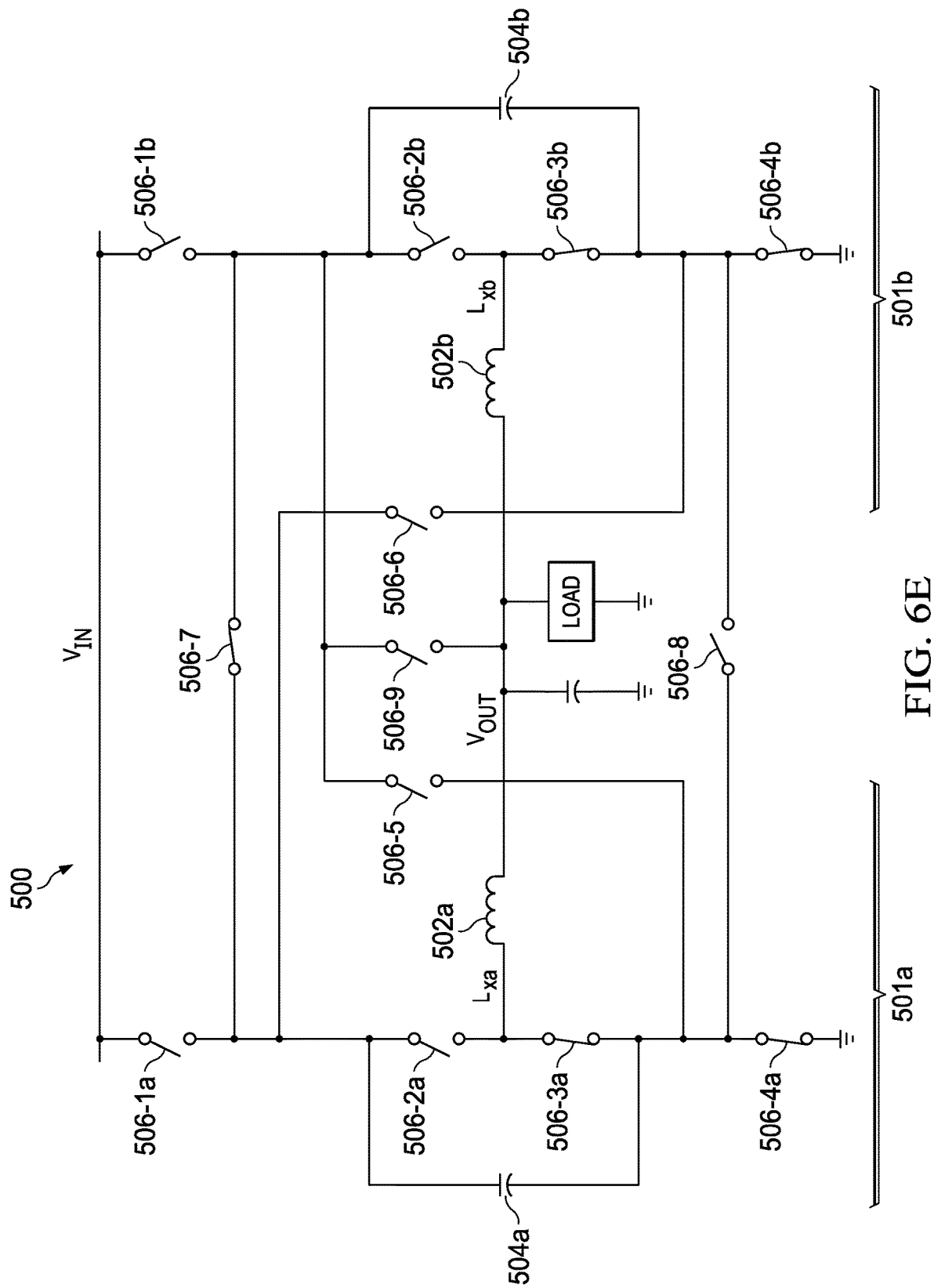
Figure 6F:
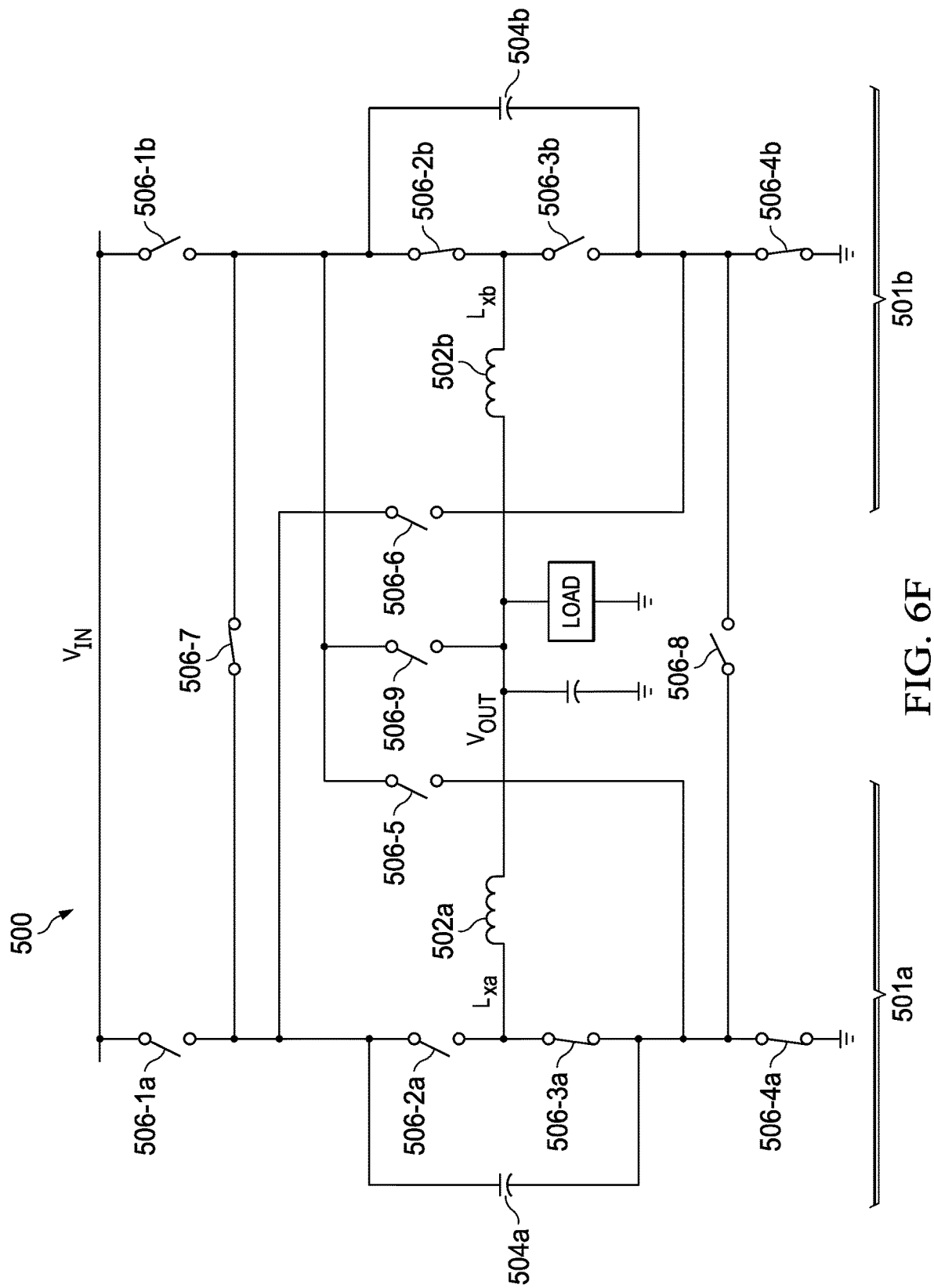
Figure 6G:
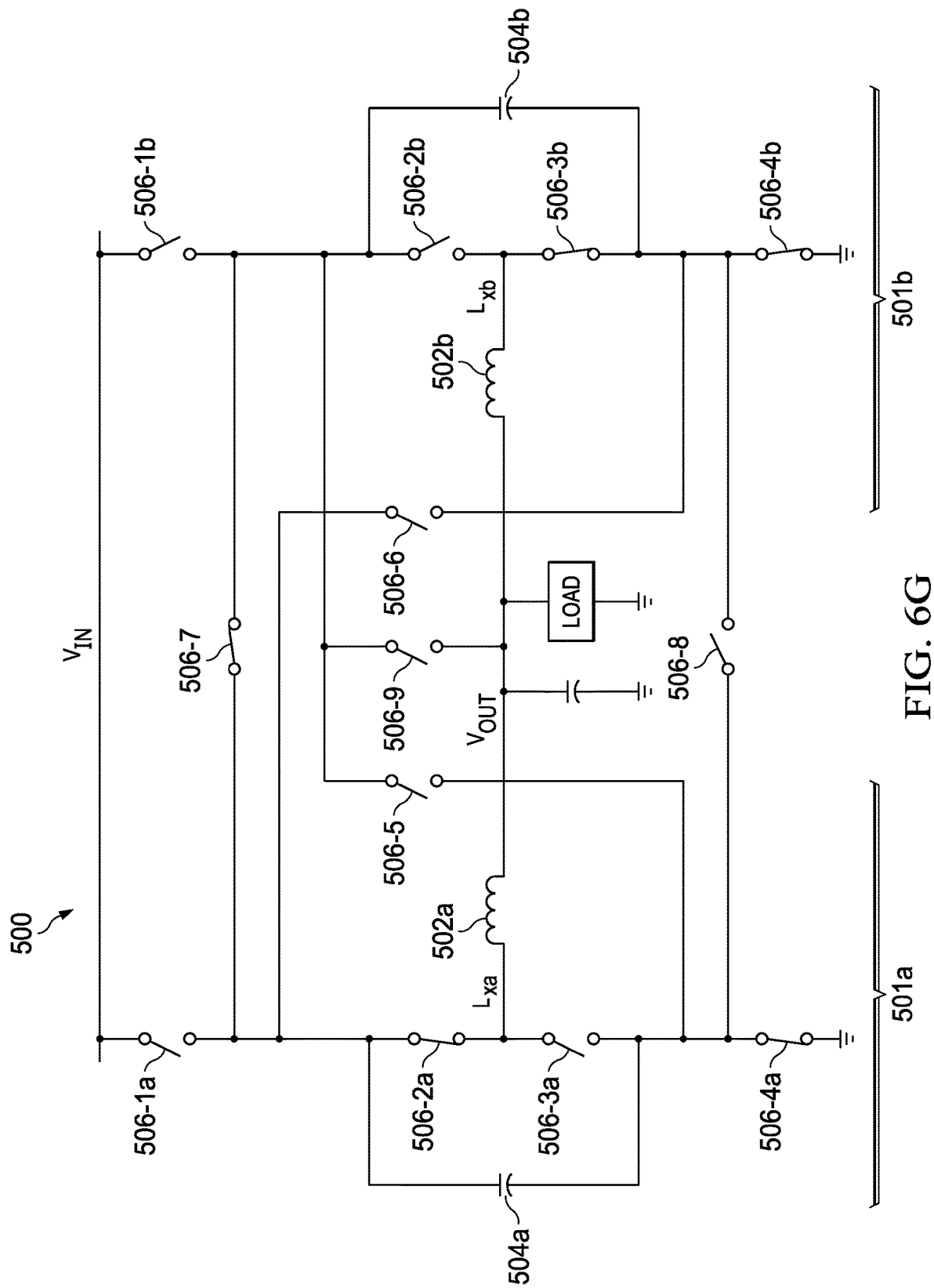

As a further example, as is shown in FIGS. 6E, 6F, and 6G, balancing switch 506-7 may be activated during one or more switching states of two-phase hybrid 3-level power converter 500 such that flying capacitors 504a and 504b are placed in parallel with flying capacitors 504a and 504b each coupled to the ground voltage. Although FIGS. 6E, 6F, and 6G depict three switching states in which flying capacitors 504a and 504b are placed in parallel via balancing switch 506-7, other switching states of two-phase hybrid 3-level power converter 500 in which flying capacitors 504a and 504b are placed in parallel via balancing switch 506-7 may be utilized.

Figure 6H:
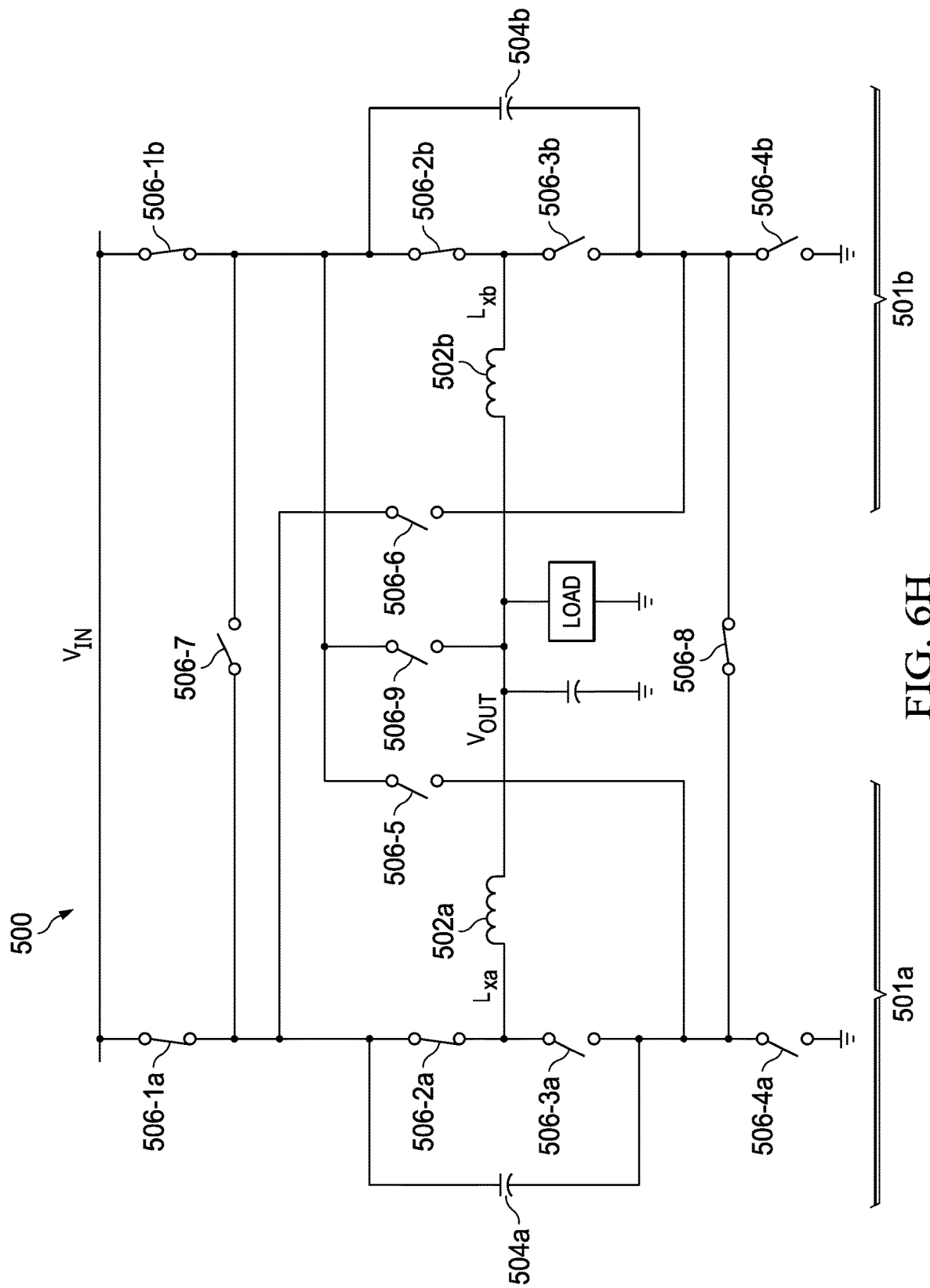
Figure 6I:
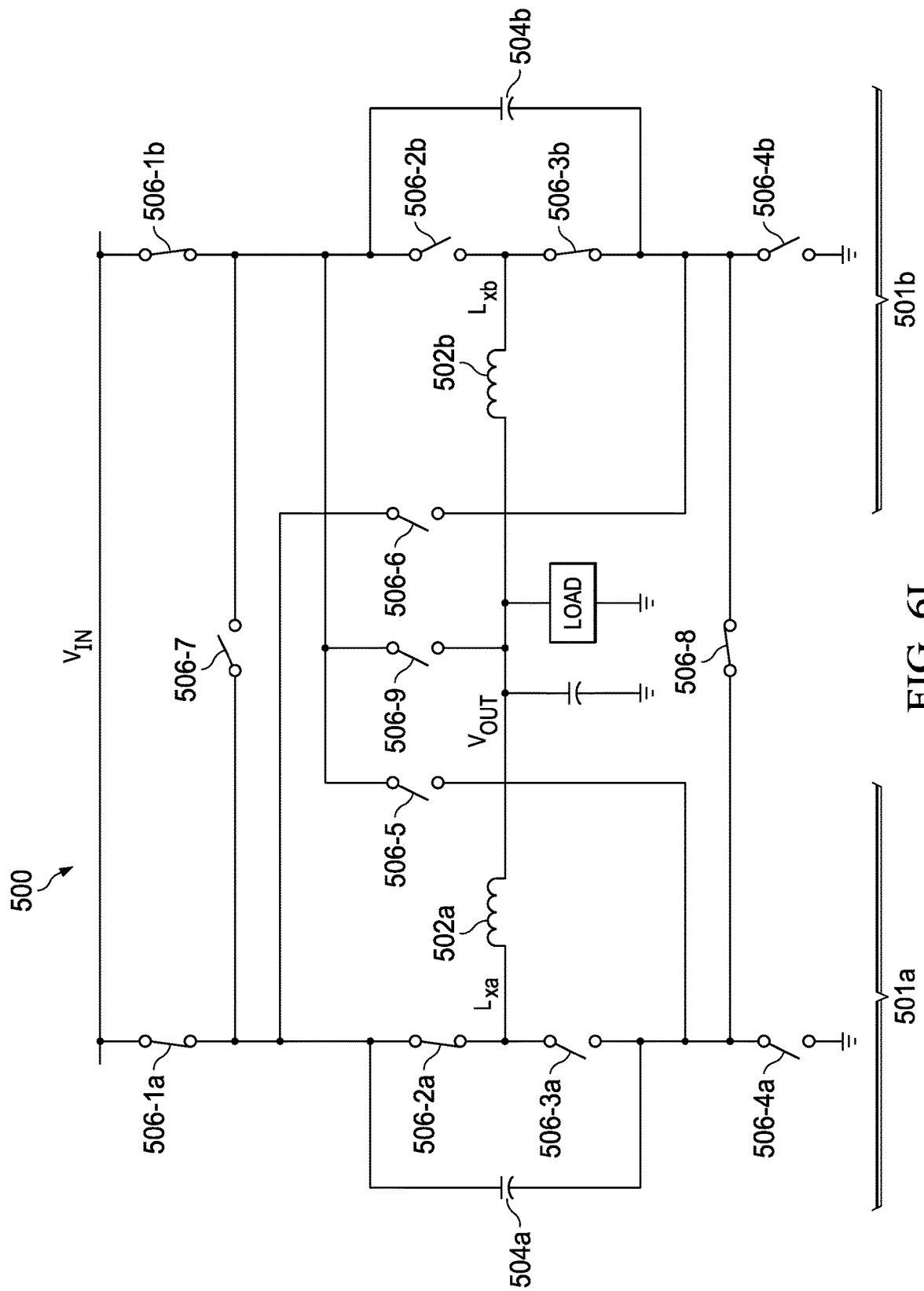
Figure 6J:
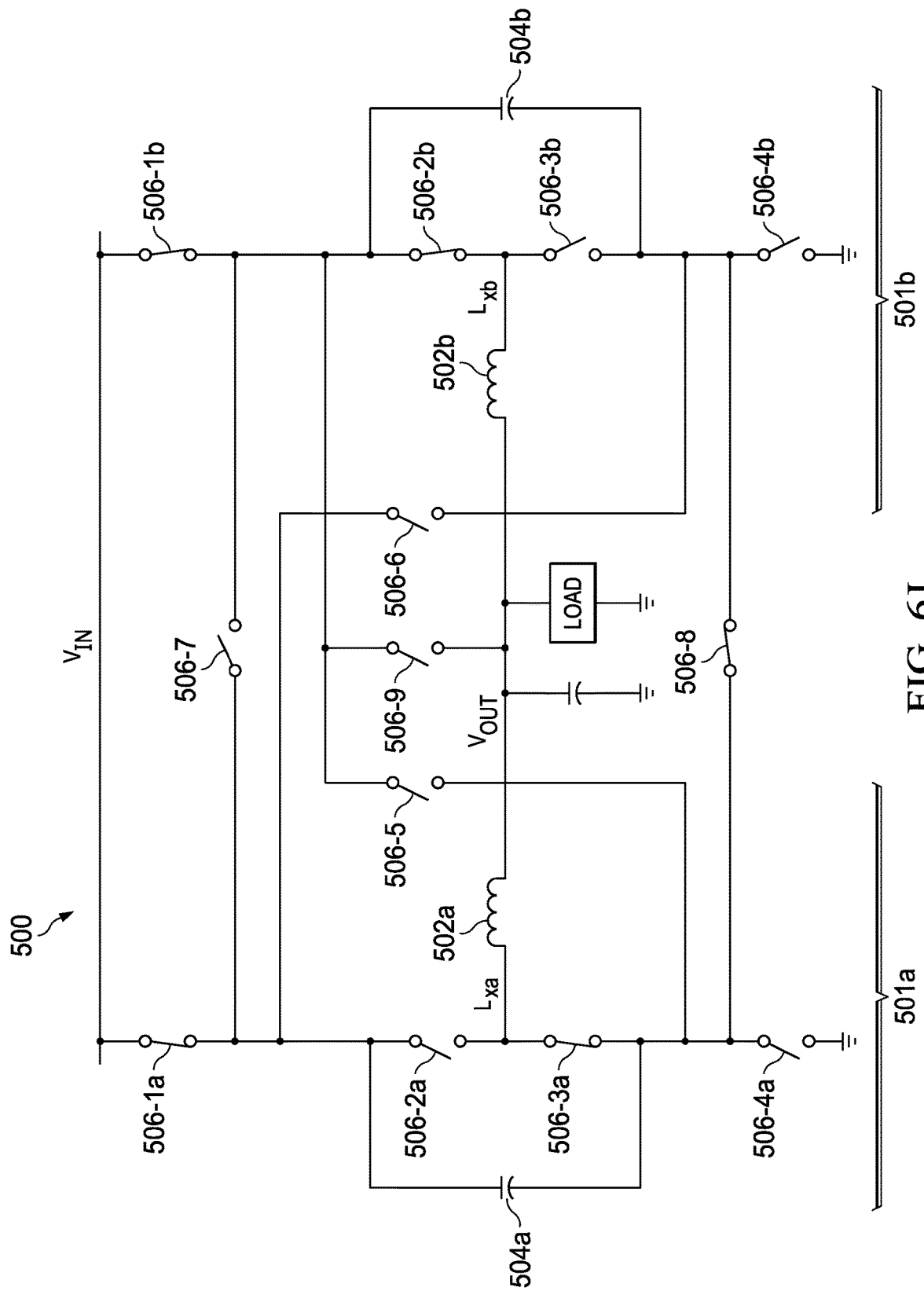

As an additional example, as is shown in FIGS. 6H, 6I, and 6J, balancing switch 506-8 may be activated during one or more switching states of two-phase hybrid 3-level power converter 500 such that flying capacitors 504a and 504b are placed in parallel with flying capacitors 504a and 504b each coupled to input voltage $V_{IN}$. Although FIGS. 6H, 6I, and 6J depict three switching states in which flying capacitors 504a and 504b are placed in parallel via balancing switch 506-8, other switching states of two-phase hybrid 3-level power converter 500 in which flying capacitors 504a and 504b are placed in parallel via balancing switch 506-8 may be utilized.

Figure 7A:
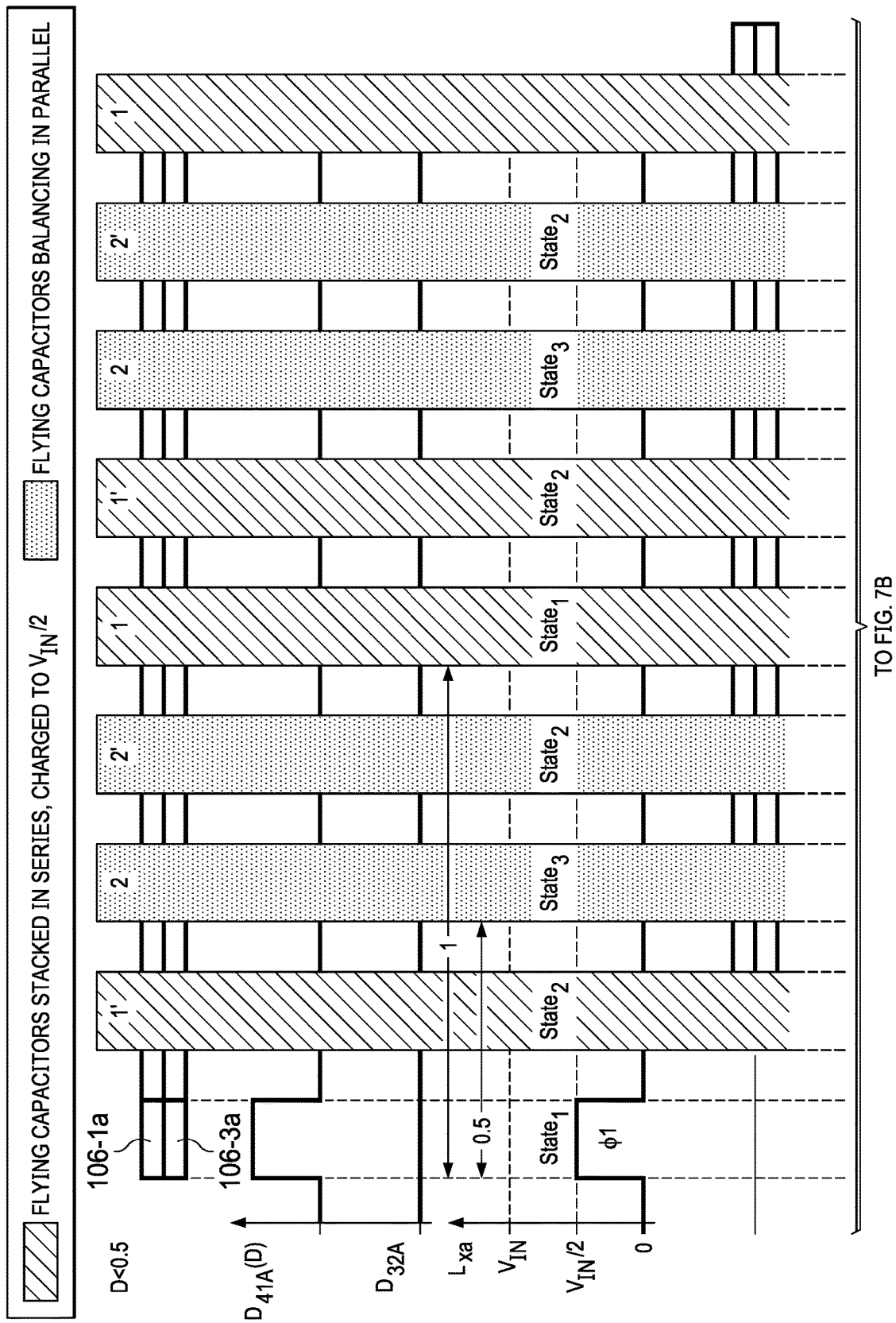
FIGS. 7A and 7B (which may be referred to collectively herein as "FIG. 7") illustrate waveforms depicting general two-phase operation of the two-phase hybrid 3-level power converter shown in FIG. 5 in a buck mode for duty cycles less than 0.5, in accordance with embodiments of the present disclosure.
Figure 7B:
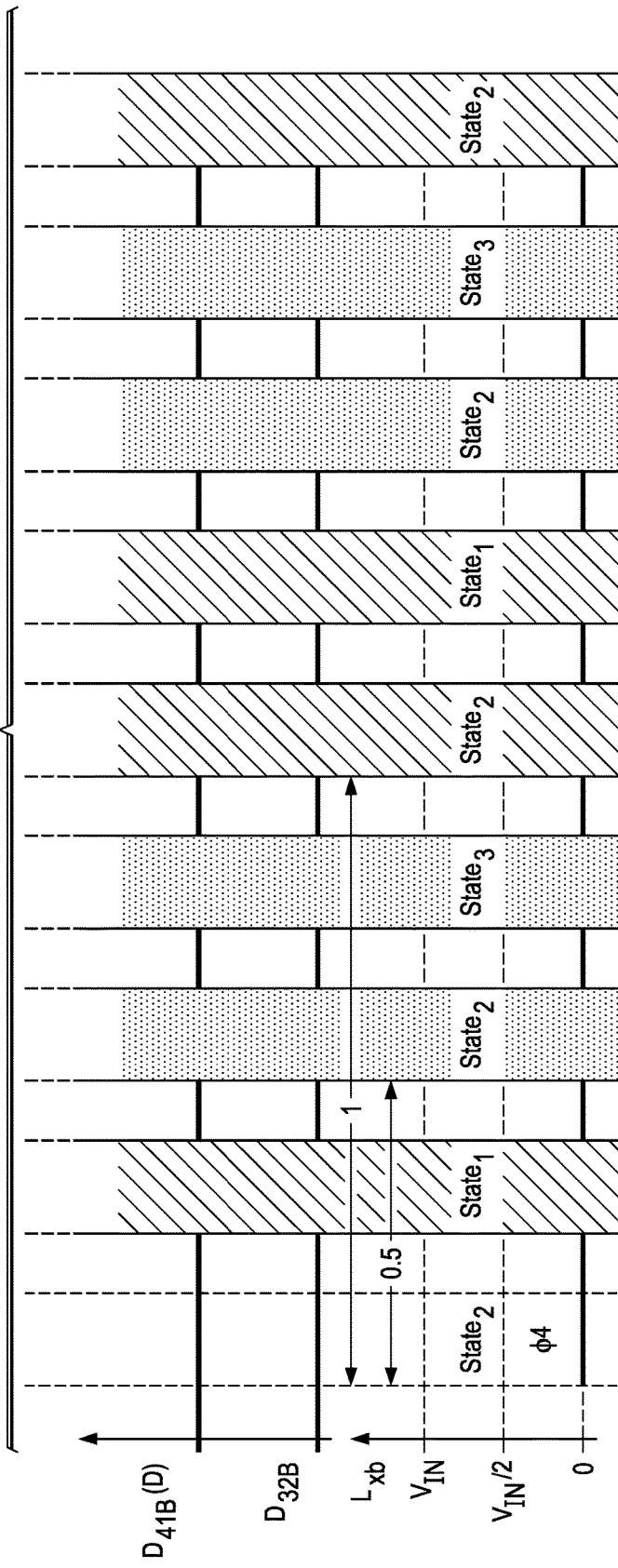
Figure 7B:
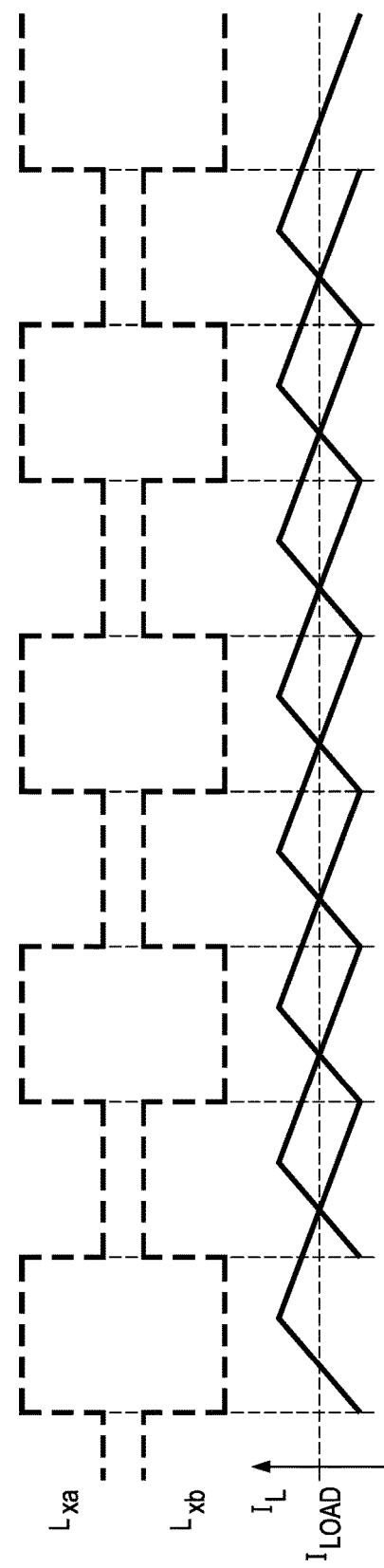

FIG. 7 illustrates waveforms depicting an example general two-phase operation of two-phase hybrid 3-level power converter 500 in a buck mode for duty cycles less than 0.5, in accordance with embodiments of the present disclosure. In general, operation of two-phase hybrid 3-level power converter 500 in the buck mode is similar to that of two-phase 3-level buck converter 100, with the exception of switches 506-5, 506-6, 506-7, and 506-8. As shown in FIG. 7, two-phase hybrid 3-level power converter 500 may operate in a total of eight states in the buck mode with duty cycles less than 0.5, due to a total of four states of phase 501a being repeated over multiple switching cycles, a total of four states of phase 501b being repeated over multiple switching cycles, and the cycles of phases 501a and 501b being shifted from each other in order to minimize ripple on output voltage $V_{OUT}$. In FIG. 7, light shading indicates those states in which flying capacitors 504a and 504b are balanced by being coupled in series and darker shading indicates those states in which flying capacitors 504a and 504b are balanced by being coupled in parallel.

Figure 8A:
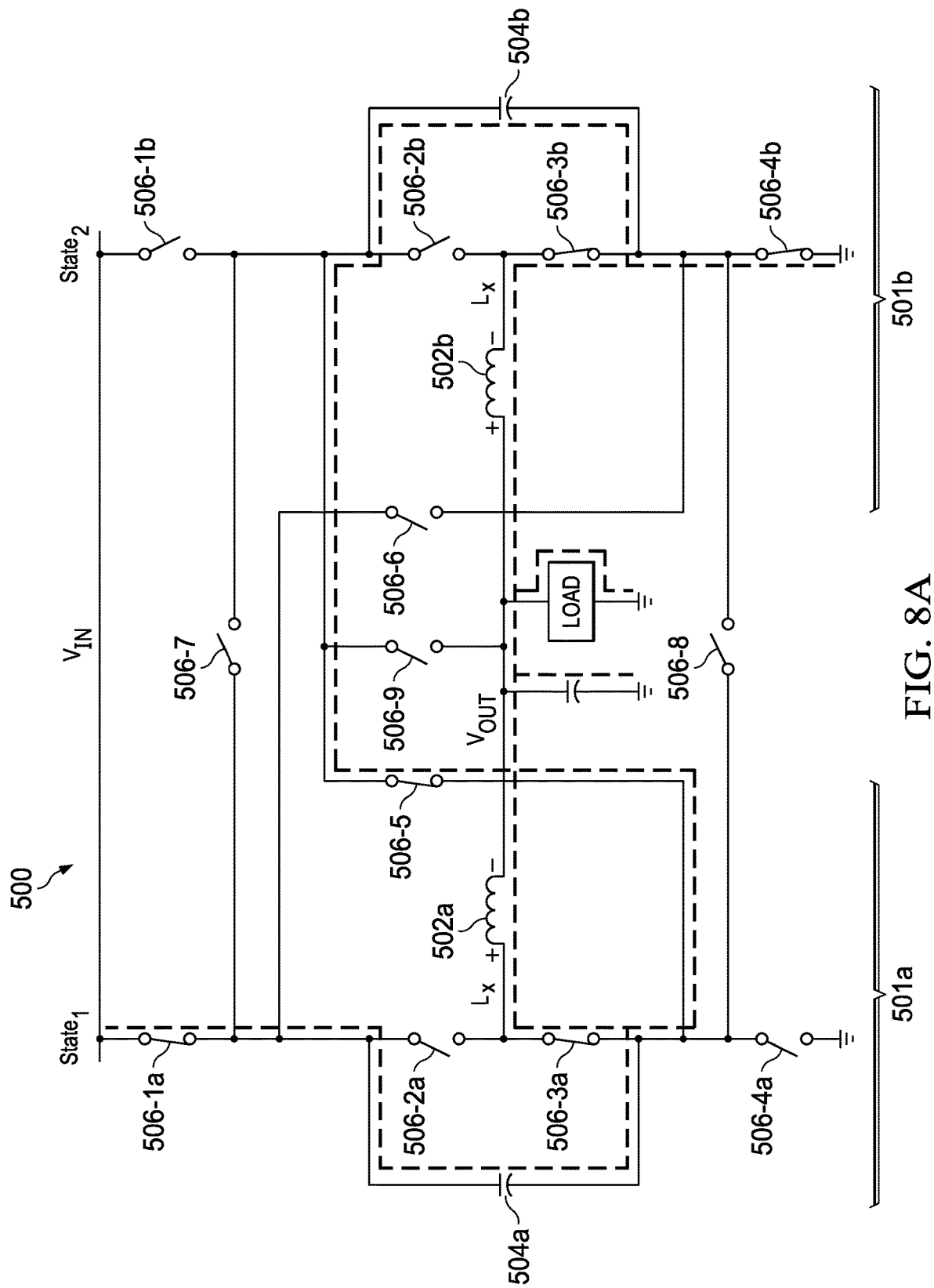
FIGS. 8A-8H illustrate circuit diagrams of example switching configurations of the two-phase hybrid 3-level power converter shown in FIG. 5 in a buck mode for duty cycles less than 0.5, in accordance with embodiments of the present disclosure.
Figure 8B:
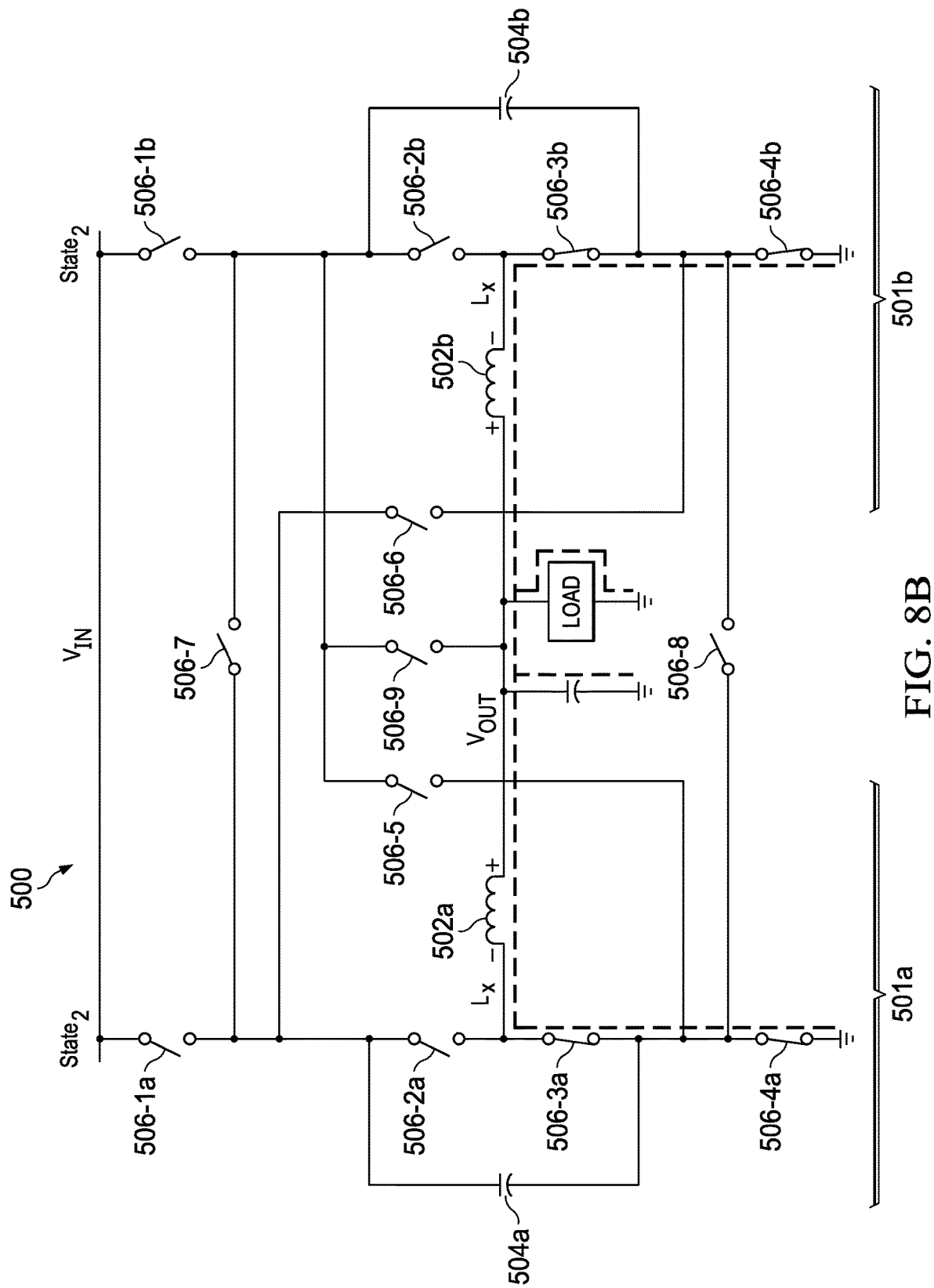
Figure 8C:
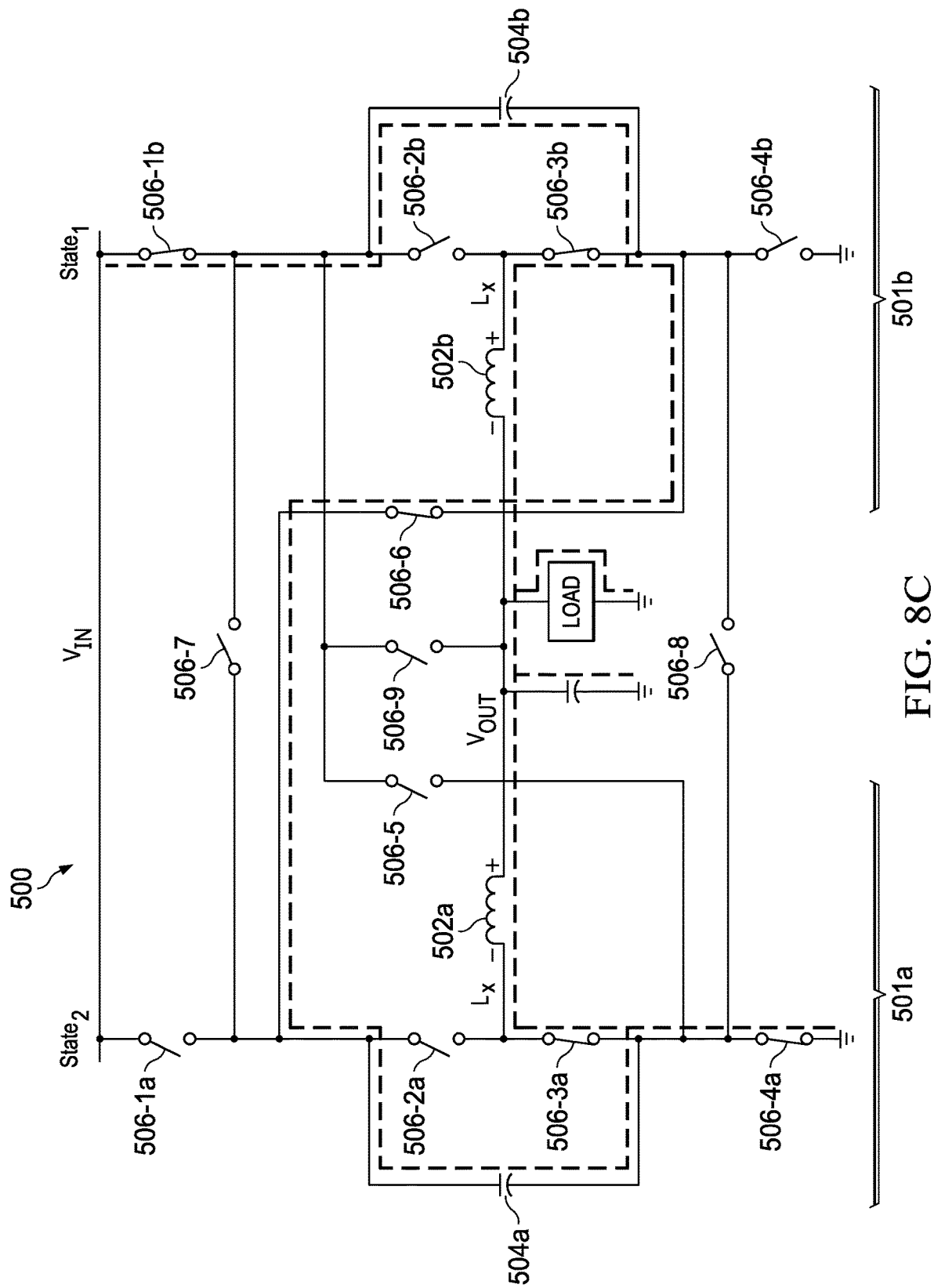
Figure 8D:
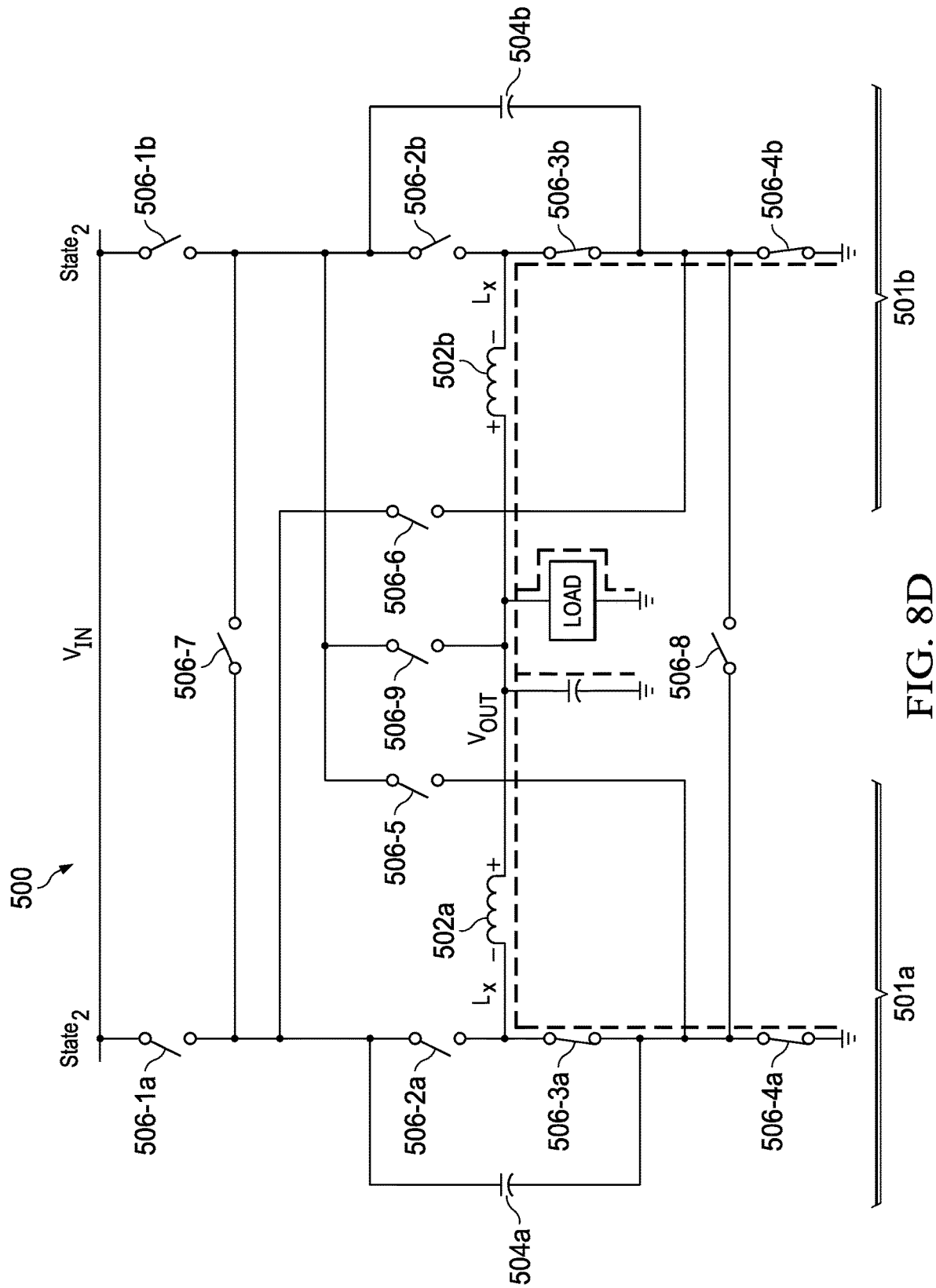

These eight states of operation of two-phase hybrid 3-level power converter 500 for duty cycles less than 0.5 are depicted in FIGS. 8A-8H. In a first state, as shown in FIG. 8A, phase 501a is in its first state while phase 501b is in its second state, and switch 506-5 may be activated to couple flying capacitors 504a and 504b in series. In a second state, as shown in FIG. 8B, phase 501a is in its second state while phase 501b is in its second state, with no balancing between flying capacitors 504a and 504b. In a third state, as shown in FIG. 8C, phase 501a is in its second state while phase 501b is in its first state, and switch 506-6 may be activated to couple flying capacitors 504a and 504b in series. In a fourth state, as shown in FIG. 8D, phase 501a is in its second state while phase 501b is in its second state, with no balancing between flying capacitors 504a and 504b.

Figure 8E:
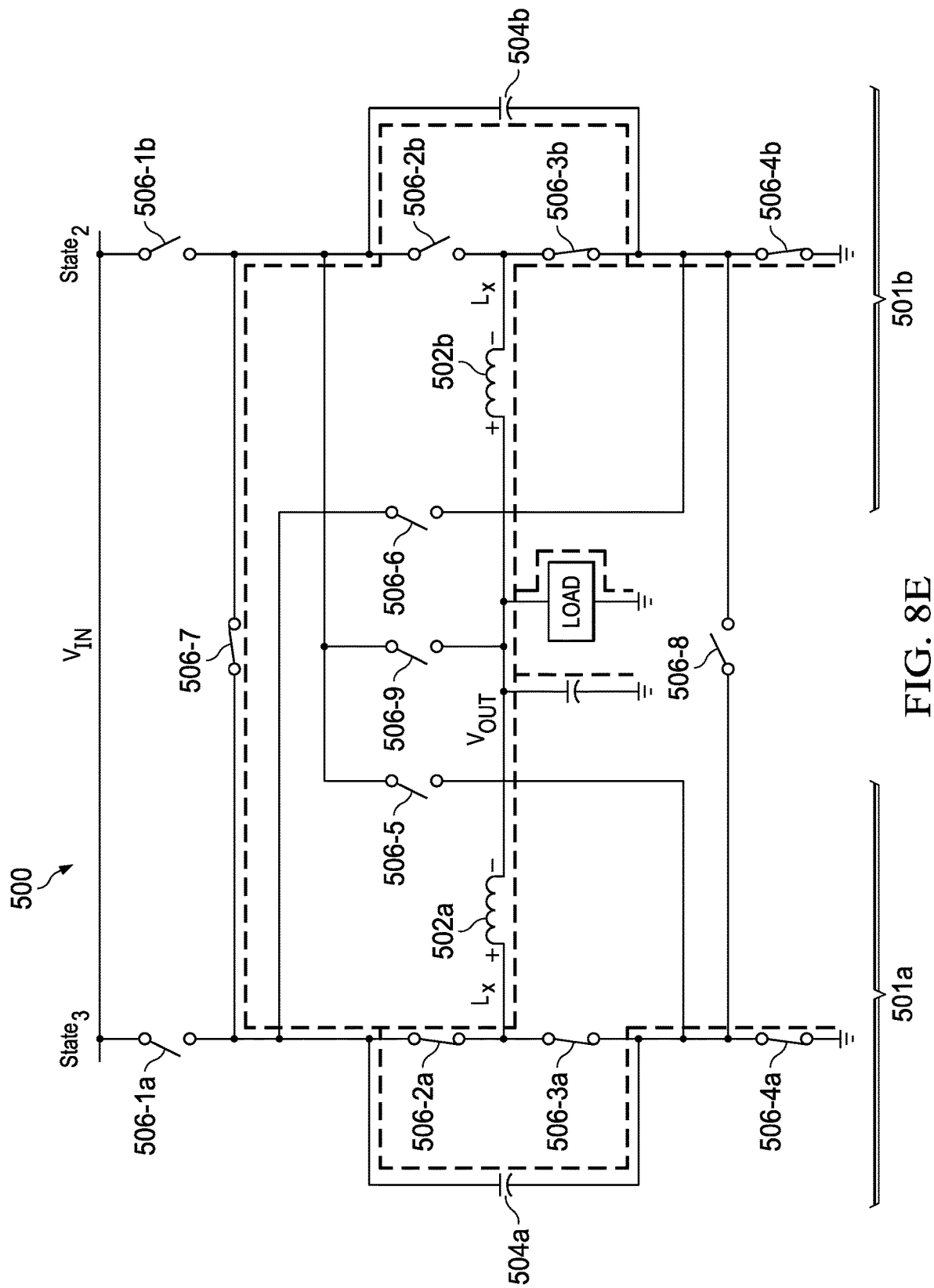
Figure 8F:
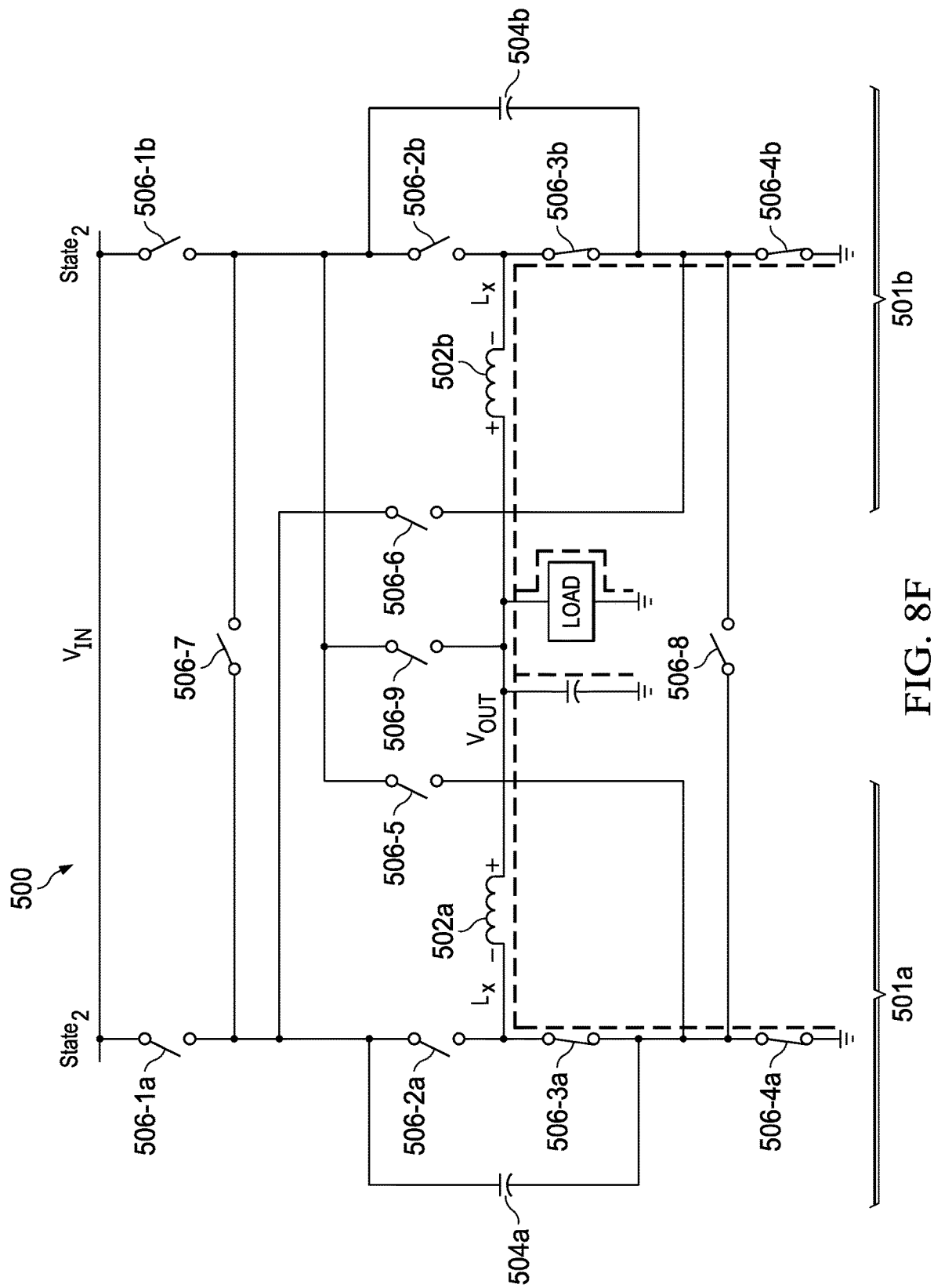
Figure 8G:
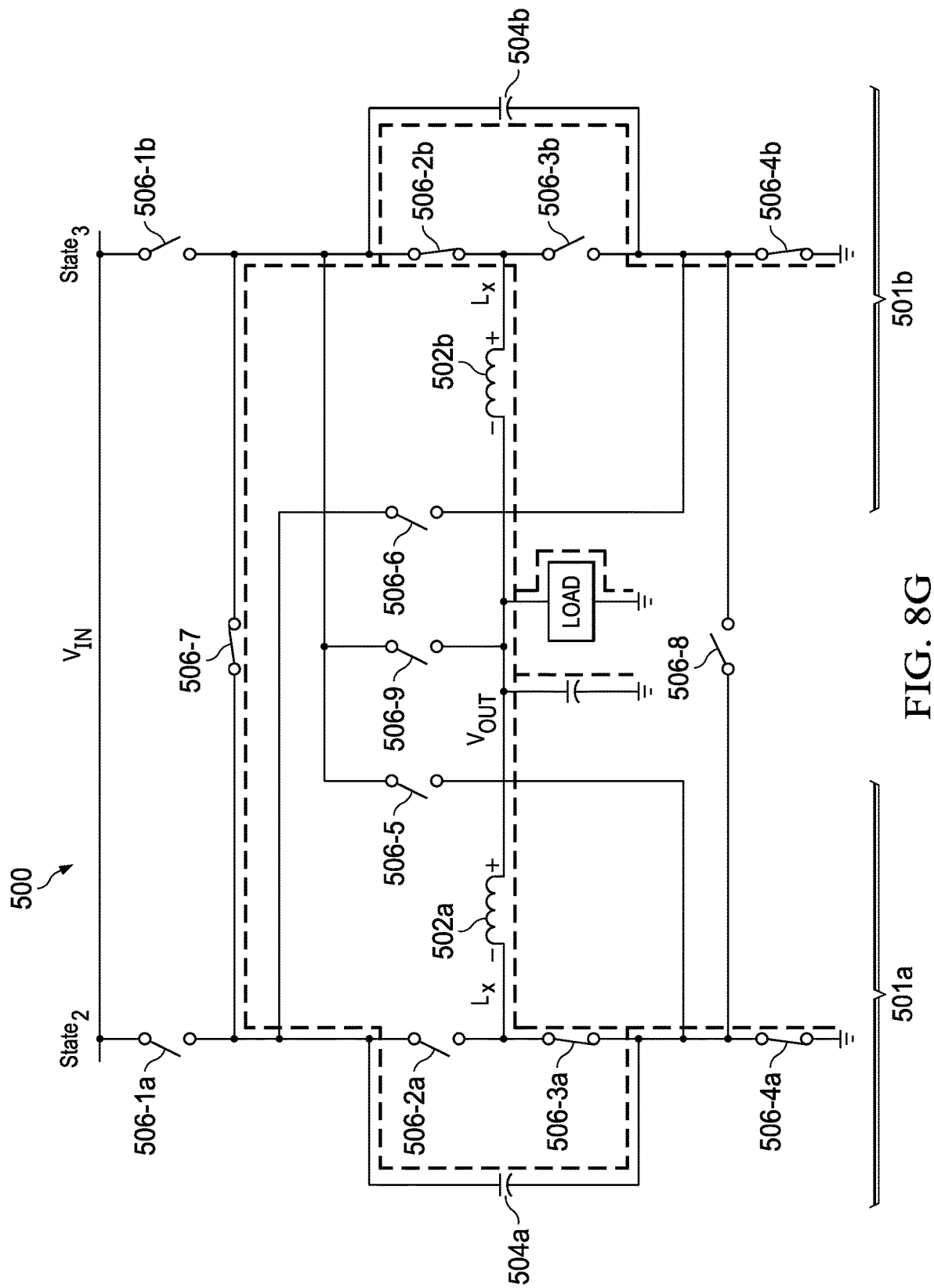
Figure 8H:
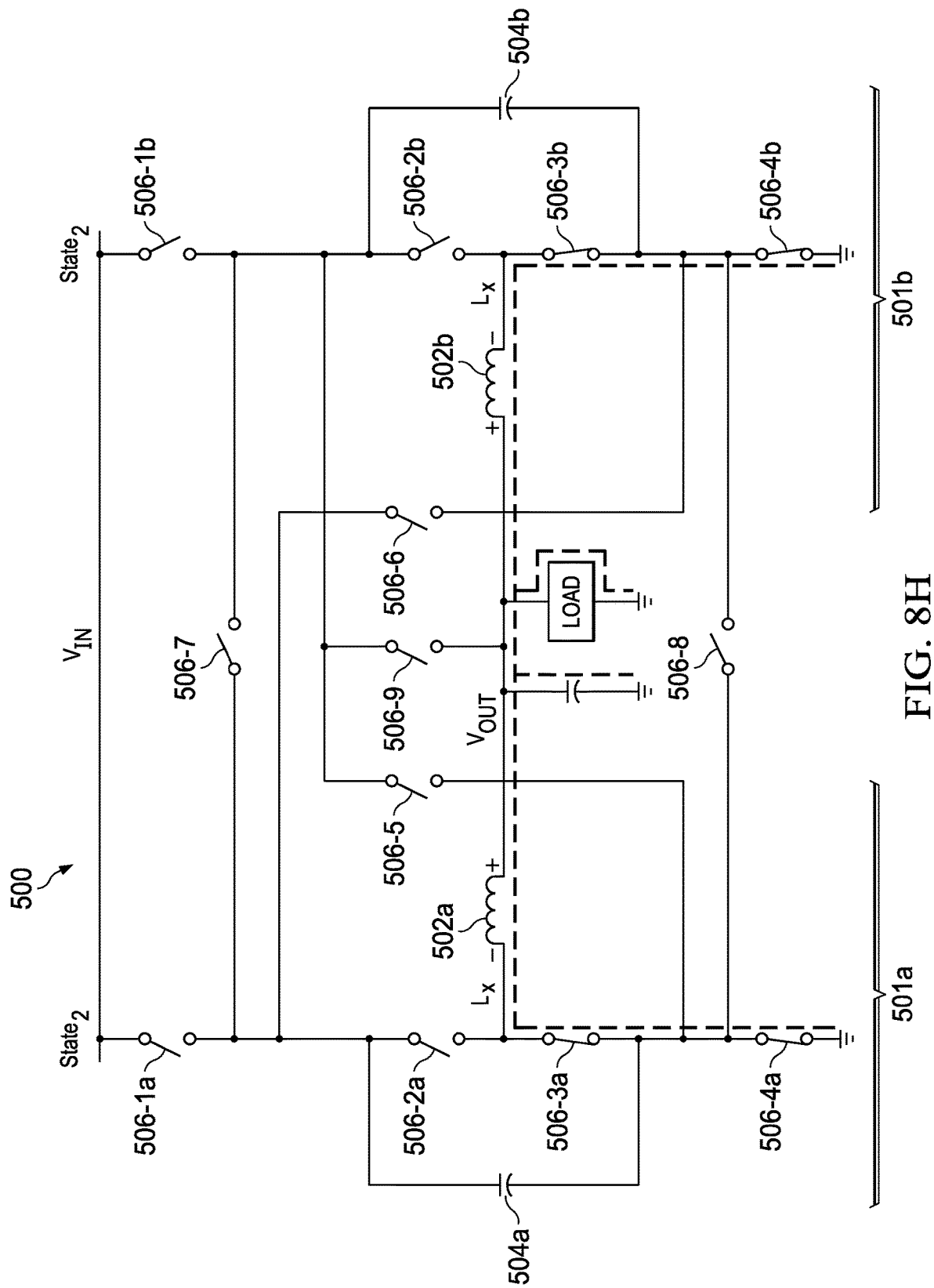

In a fifth state, as shown in FIG. 8E, phase 501a is in its third state while phase 501b is in its second state, and switch 506-7 may be activated to couple flying capacitors 504a and 504b in parallel. In a sixth state, as shown in FIG. 8F, phase 501a is in its second state while phase 501b is in its second state, with no balancing between flying capacitors 504a and 504b. In a seventh state, as shown in FIG. 8G, phase 501a is in its second state while phase 501b is in its third state, and switch 506-7 may be activated to couple flying capacitors 504a and 504b in parallel. In an eighth state, as shown in FIG. 8H, phase 501a is in its second state while phase 501b is in its second state, with no balancing between flying capacitors 504a and 504b.

Although FIGS. 7 and 8A-8H depict a general two-phase operation of two-phase hybrid 3-level power converter 500 in a buck mode for duty cycles less than 0.5, any other suitable switching sequences may be used to implement operation of two-phase hybrid 3-level power converter 500 in a buck mode for duty cycles less than 0.5 while achieving balancing between flying capacitors 504a and 504b.

Figure 9A:
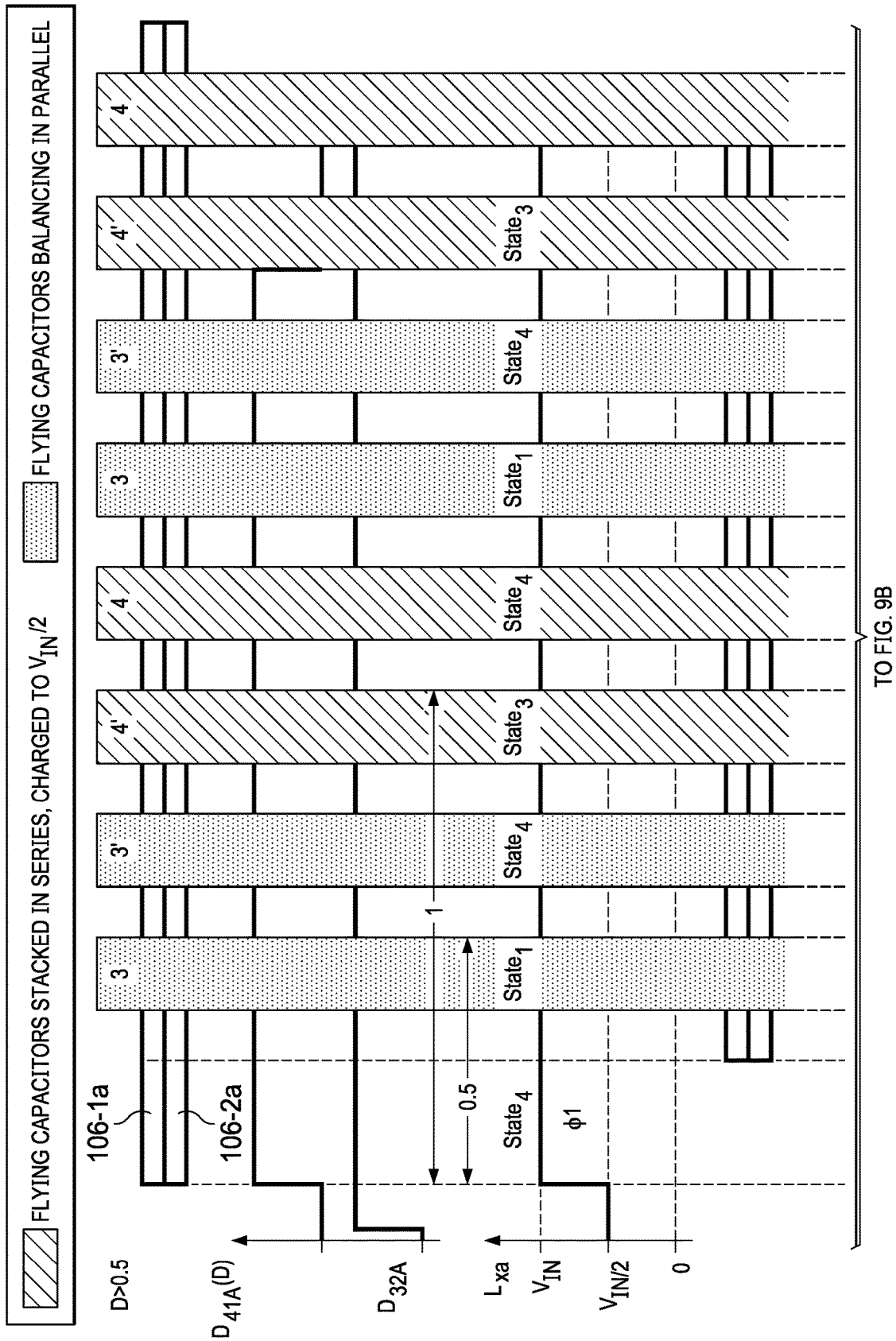
FIGS. 9A and 9B (which may be referred to collectively herein as "FIG. 9") illustrate waveforms depicting general two-phase operation of the two-phase hybrid 3-level power converter shown in FIG. 5 in a buck mode for duty cycles greater than 0.5, in accordance with embodiments of the present disclosure.
Figure 9B:
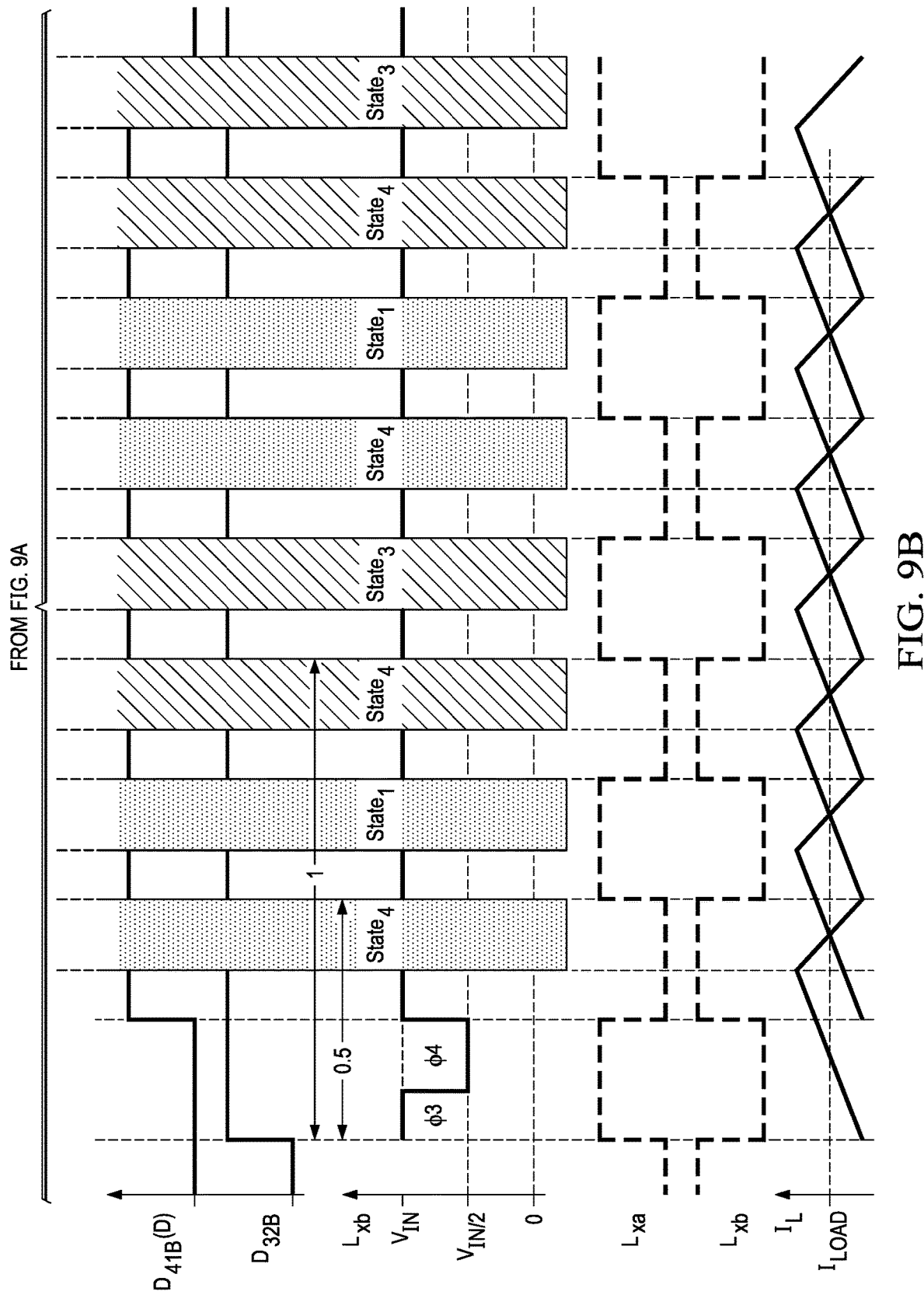

FIG. 9 illustrates waveforms depicting an example general two-phase operation of two-phase hybrid 3-level power converter 500 in a buck mode for duty cycles greater than 0.5, in accordance with embodiments of the present disclosure. As shown in FIG. 9, two-phase hybrid 3-level power converter 500 may operate in a total of eight states in the buck mode with duty cycles greater than 0.5, similar to operation for duty cycles less than 0.5. In FIG. 9, light shading indicates those states in which flying capacitors 504a and 504b are balanced by being coupled in series and darker shading indicates those states in which flying capacitors 504a and 504b are balanced by being coupled in parallel.

Figure 10A:
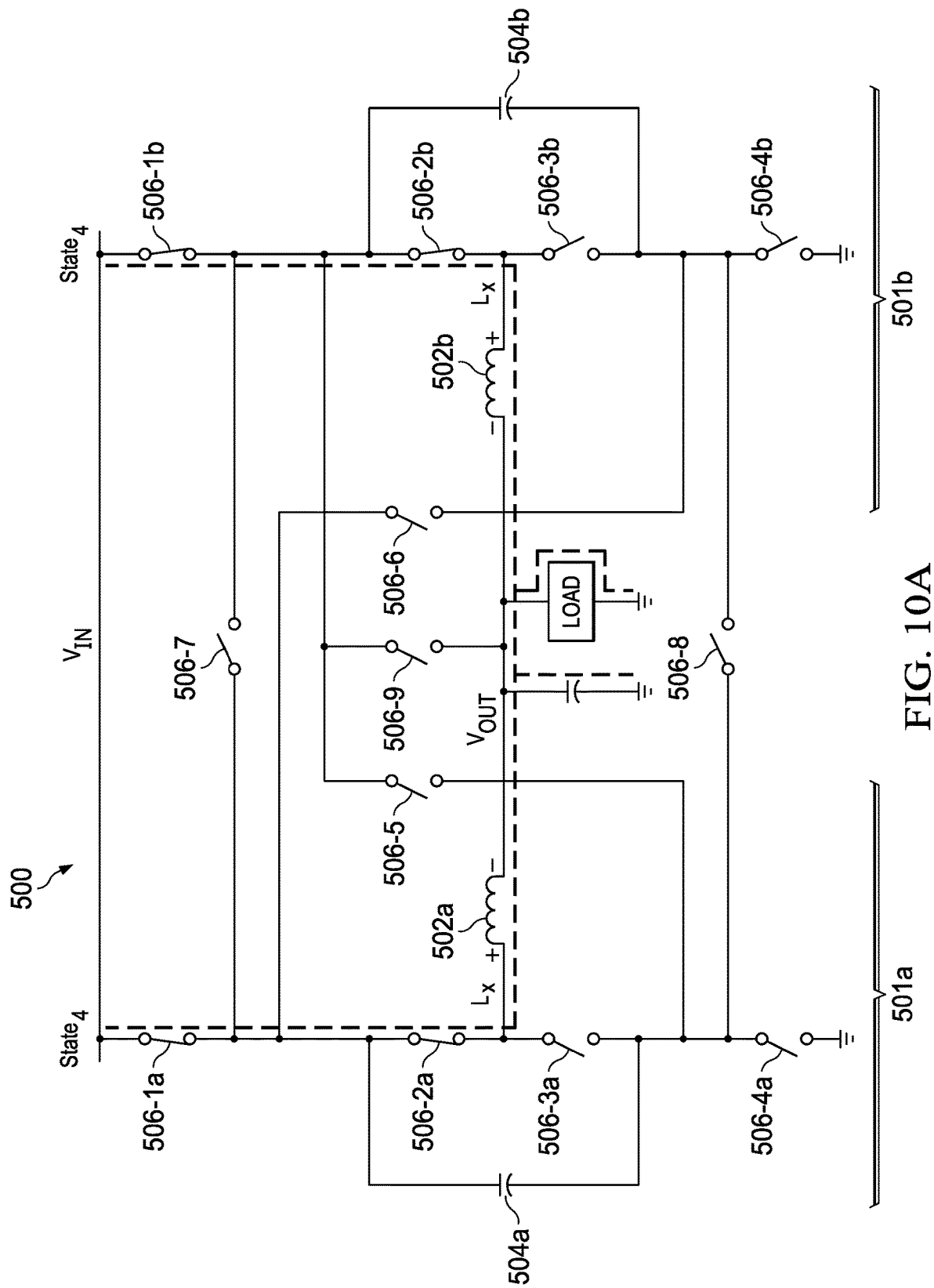
FIGS. 10A-10H illustrate circuit diagrams of example switching configurations of the two-phase hybrid 3-level power converter shown in FIG. 5 in a buck mode for duty cycles greater than 0.5, in accordance with embodiments of the present disclosure.
Figure 10B:
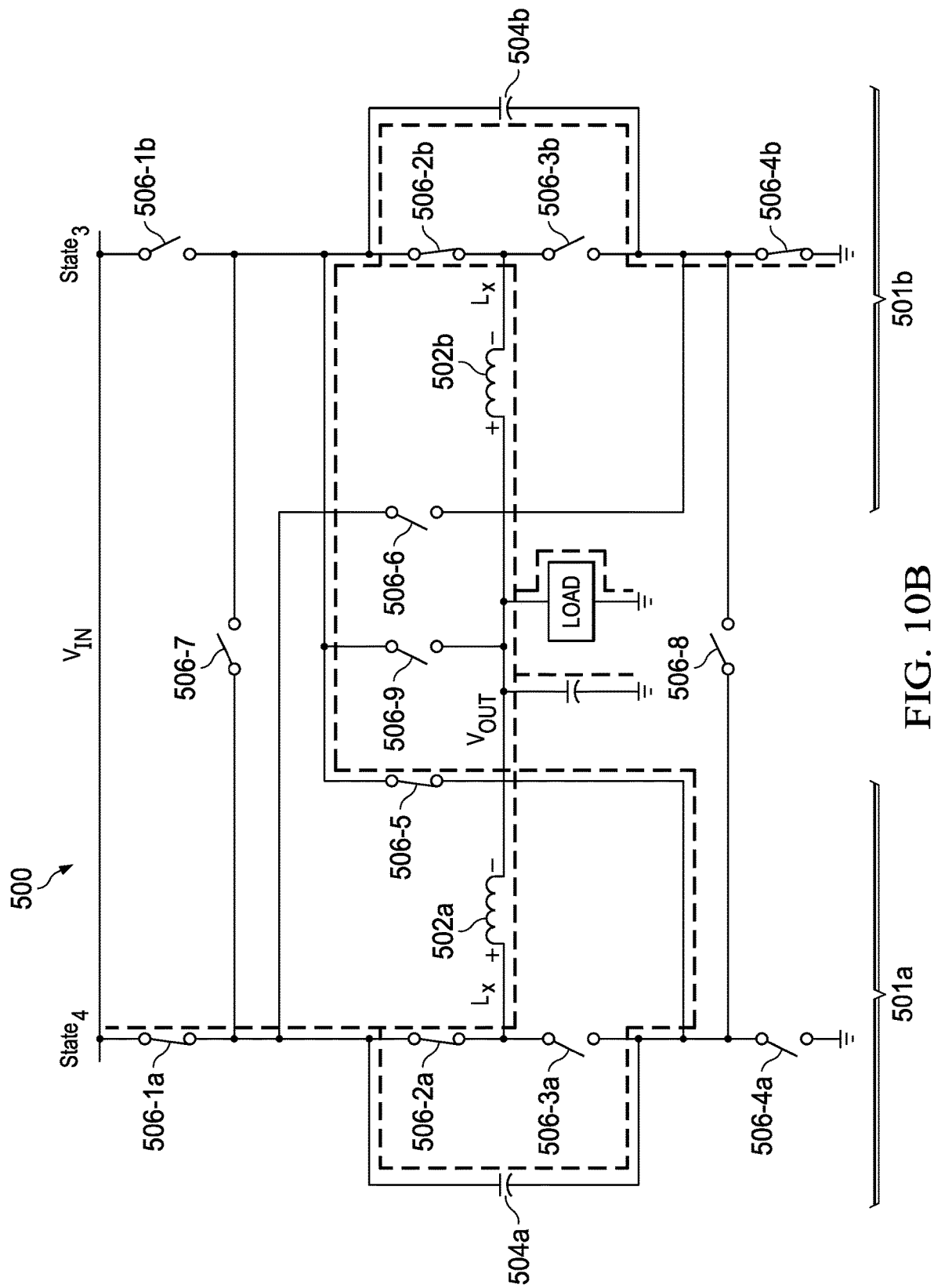
Figure 10C:
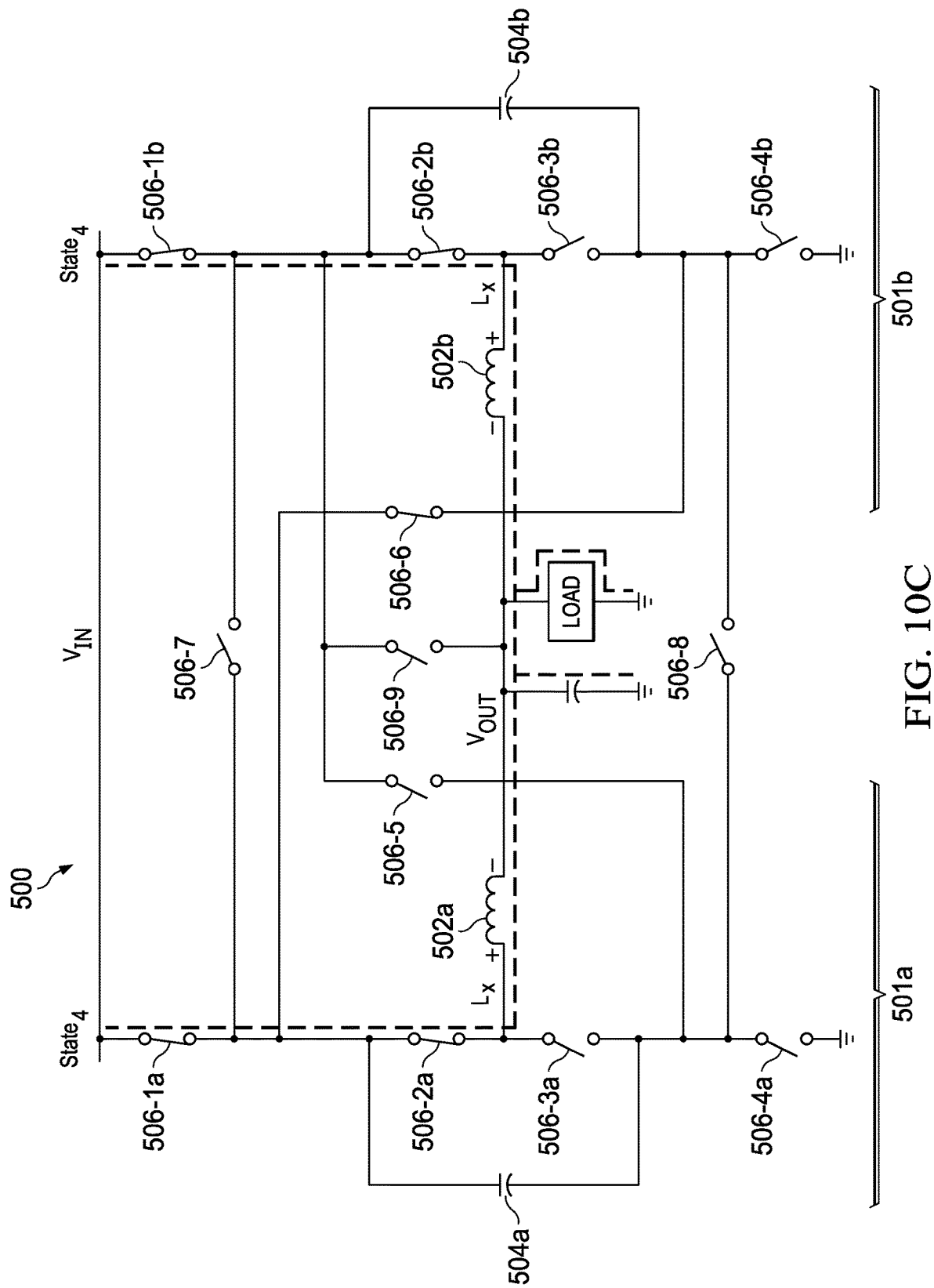
Figure 10D:
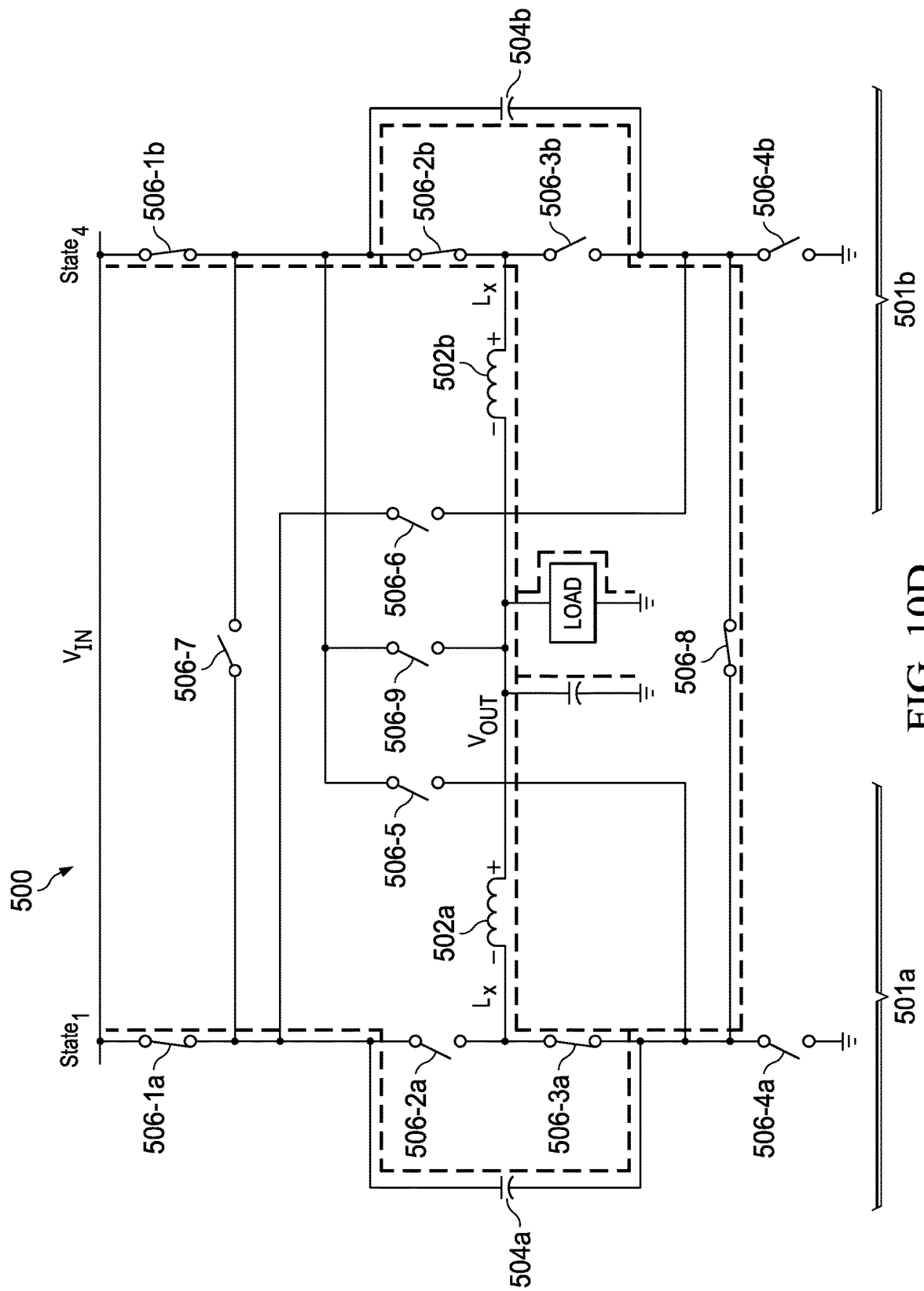

These eight states of operation of two-phase hybrid 3-level power converter 500 for duty cycles less than 0.5 are depicted in FIGS. 10A-10H. In a first state, as shown in FIG. 10A, phase 501a is in its fourth state while phase 501b is in its fourth state, with no balancing between flying capacitors 504a and 504b. In a second state, as shown in FIG. 10B, phase 501a is in its fourth state while phase 501b is in its third state, and switch 506-5 may be activated to couple flying capacitors 504a and 504b in series. In a third state, as shown in FIG. 10C, phase 501a is in its fourth state while phase 501b is in its fourth state, with no balancing between flying capacitors 504a and 504b. In a fourth state, as shown in FIG. 10D, phase 501a is in its first state while phase 501b is in its fourth state, and switch 506-8 may be activated to couple flying capacitors 504a and 504b in parallel.

Figure 10E:
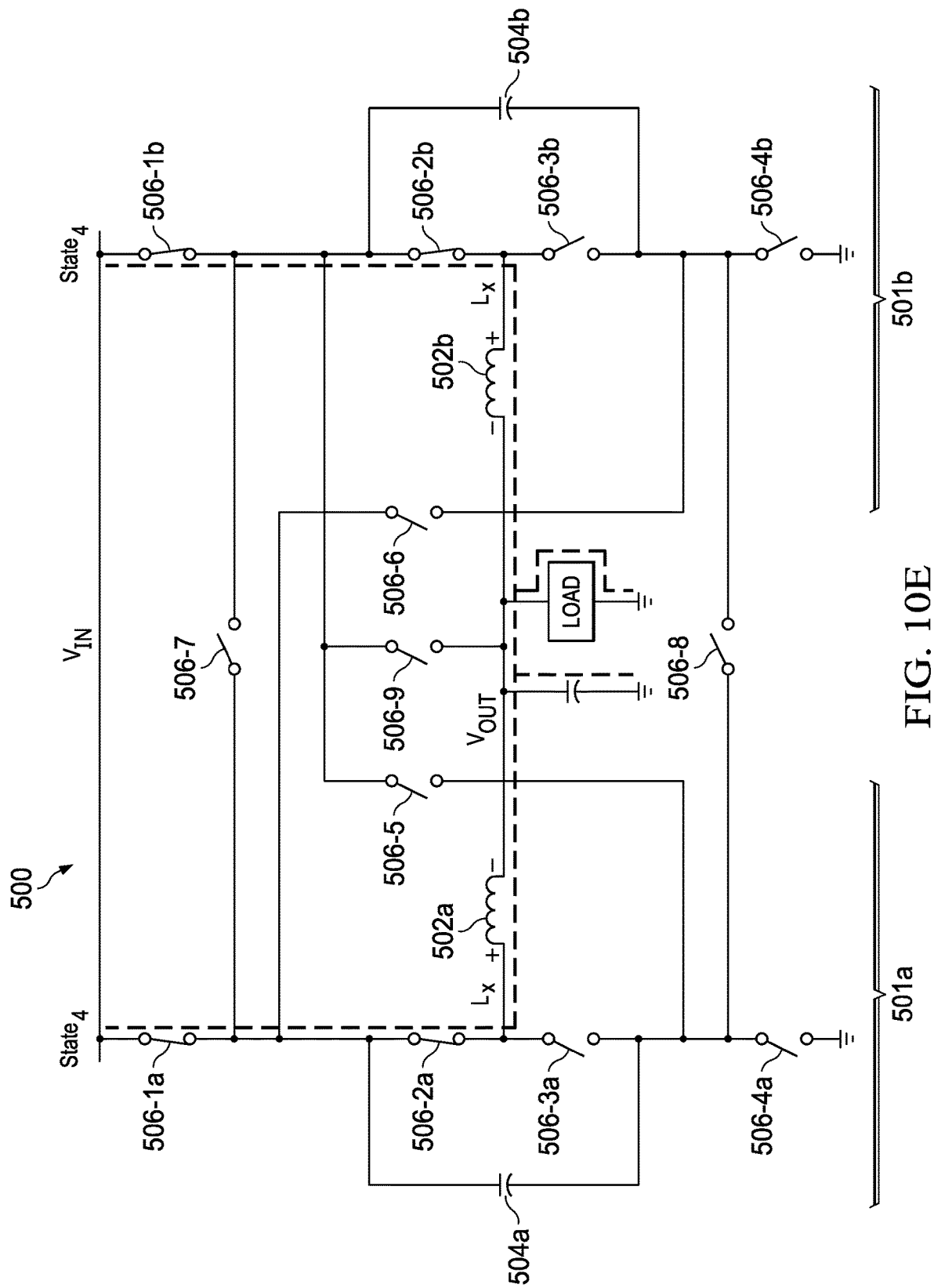
Figure 10F:
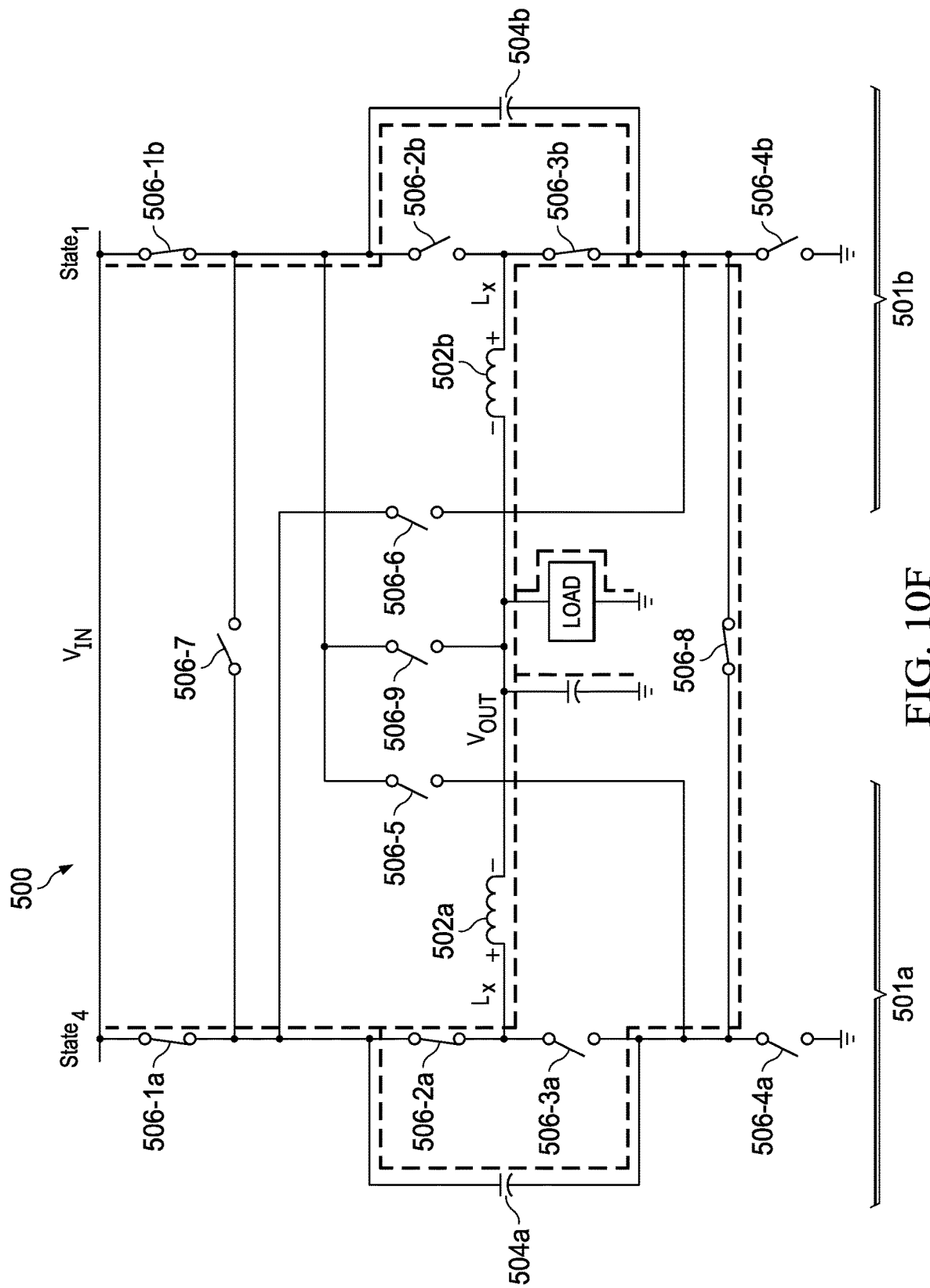
Figure 10G:
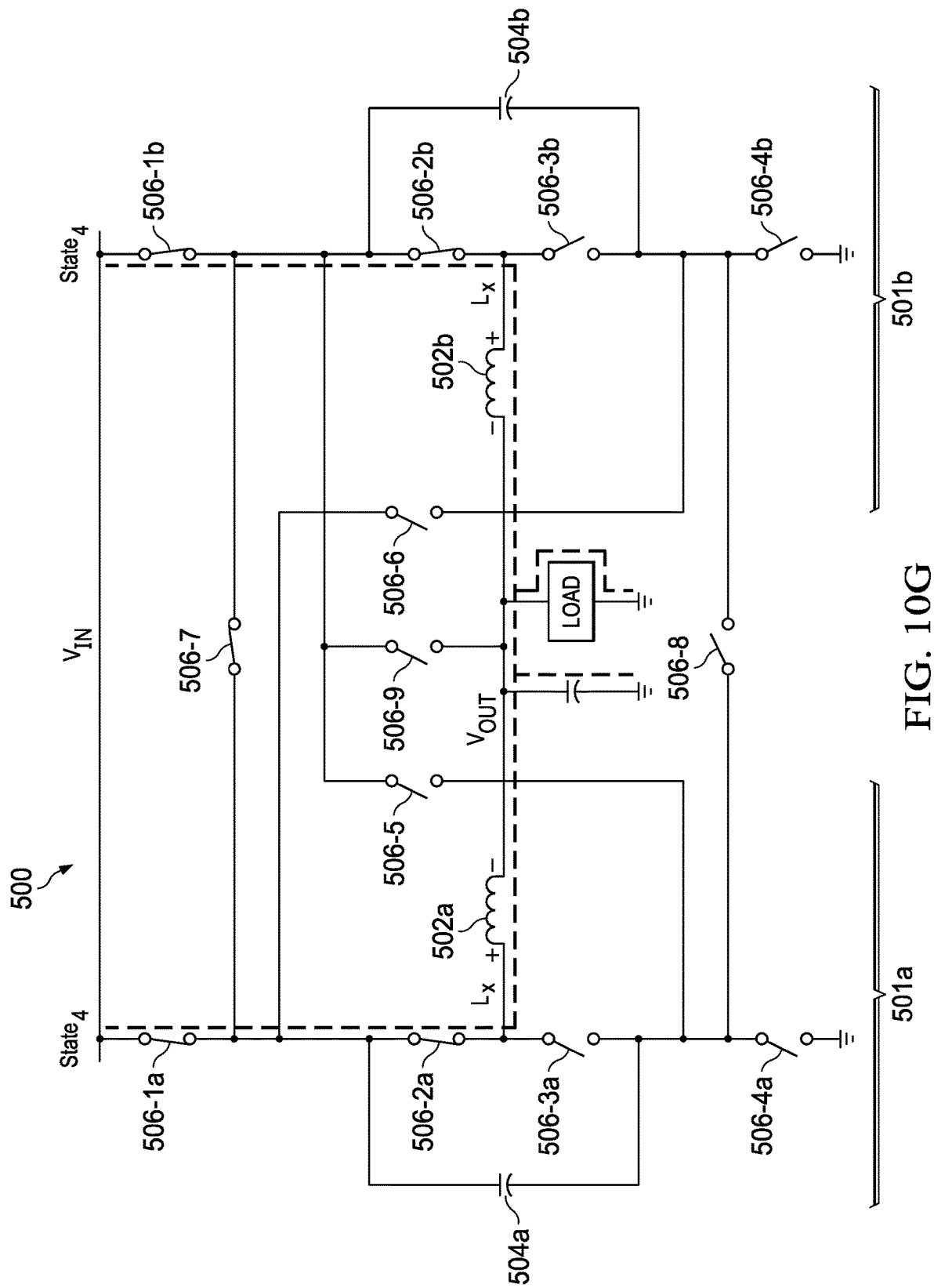
Figure 10H:
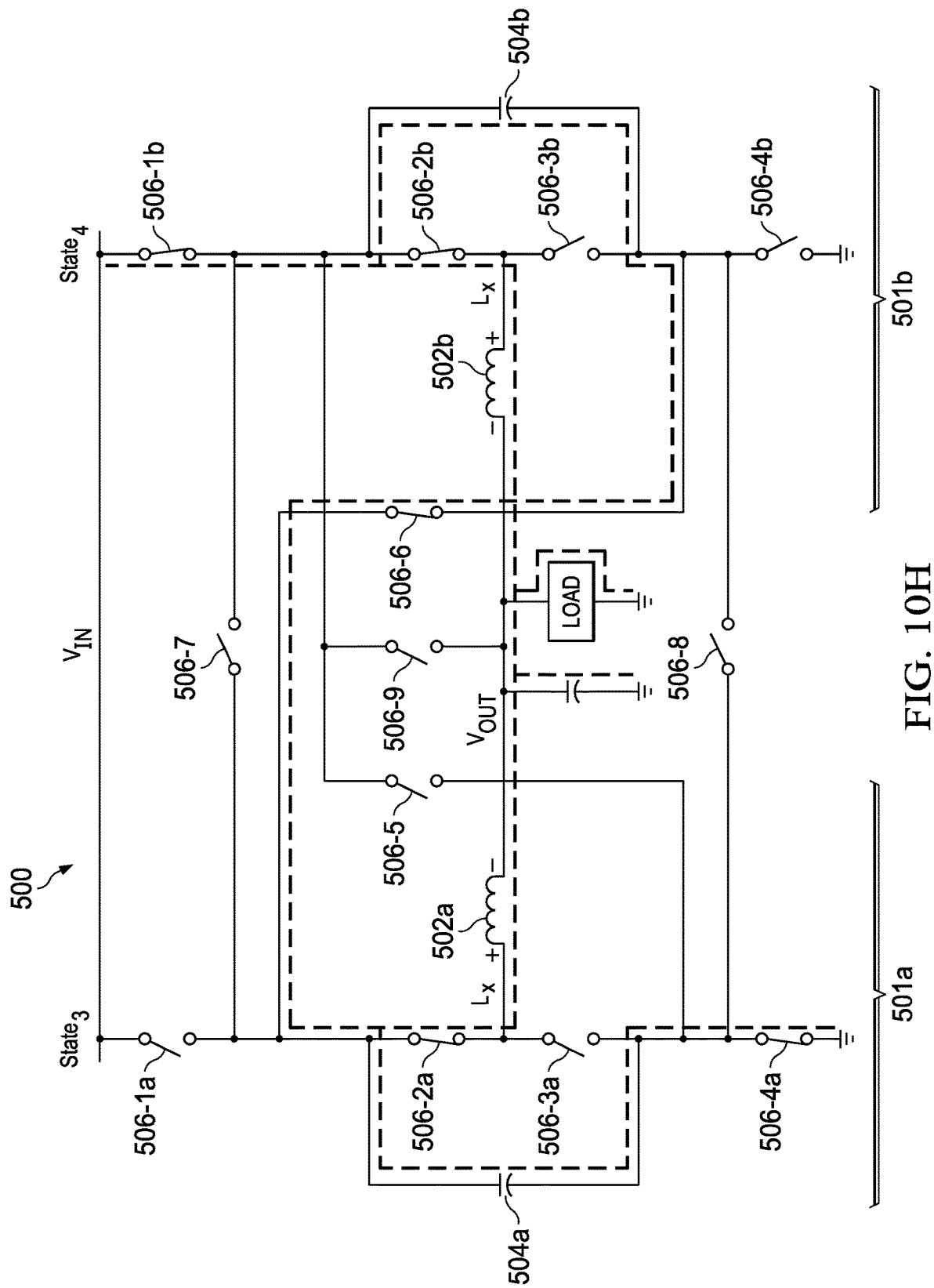

In a fifth state, as shown in FIG. 10E, phase 501a is in its fourth state while phase 501b is in its fourth state, with no balancing between flying capacitors 504a and 504b. In a sixth state, as shown in FIG. 10F, phase 501a is in its fourth state while phase 501b is in its first state, and switch 506-8 may be activated to couple flying capacitors 504a and 504b in parallel. In a seventh state, as shown in FIG. 10G, phase 501a is in its fourth state while phase 501b is in its fourth state, with no balancing between flying capacitors 504a and 504b. In an eighth state, as shown in FIG. 10H, phase 501a is in its third state while phase 501b is in its fourth state, and switch 506-6 may be activated to couple flying capacitors 504a and 504b in series.

Accordingly, in the embodiments represented by FIGS. 7 through 10H, activation of switches 506-5, 506-6, 506-7, and 506-8 may be conditioned based on which of switches 506-1, 506-2, 506-3, and 506-4 are activated. For example:

Switch 506-5 may be activated if any of the following are true:
  Switches 506-1a, 506-3a, 506-3b, and 506-4b are activated;
  Switches 506-1a, 506-2a, 506-2b, and 506-4b are activated; or
  Switches 506-1a, 506-3a, 506-2b, 506-4b are activated.
Switch 506-6 may be activated if any of the following are true:
  Switches 506-1b, 506-3b, 506-3a, and 506-4a are activated;
  Switches 506-1b, 506-2b, 506-2a, and 506-4a are activated; or
  Switches 506-1b, 506-3b, 506-2a, 506-4a are activated.
Switch 506-7 may be activated if any of the following are true:
  Switches 506-2a, 506-4a, 506-3b, and 506-4b are activated; or
  Switches 506-2b, 506-4b, 506-3a, and 506-4a are activated.
Switch 506-8 may be activated if any of the following are true:
  Switches 506-1a, 506-2a, 506-1b, and 506-3b are activated; or
  Switches 506-1b, 506-2b, 506-1a, and 506-3a are activated.

It is also understood that by swapping the input and output of two-phase hybrid 3-level power converter 500, two-phase hybrid 3-level power converter 500 may operate the same switching states depicted in FIGS. 7-10H in order to operate in a reverse 3-level boost mode.

Although FIGS. 9 and 10A-10H depict a general two-phase operation of two-phase hybrid 3-level power converter 500 in a buck mode for duty cycles less than 0.5, any other suitable switching sequences may be used to implement operation of two-phase hybrid 3-level power converter 500 in a buck mode for duty cycles less than 0.5 while achieving balancing between flying capacitors 504a and 504b.

Figure 1:
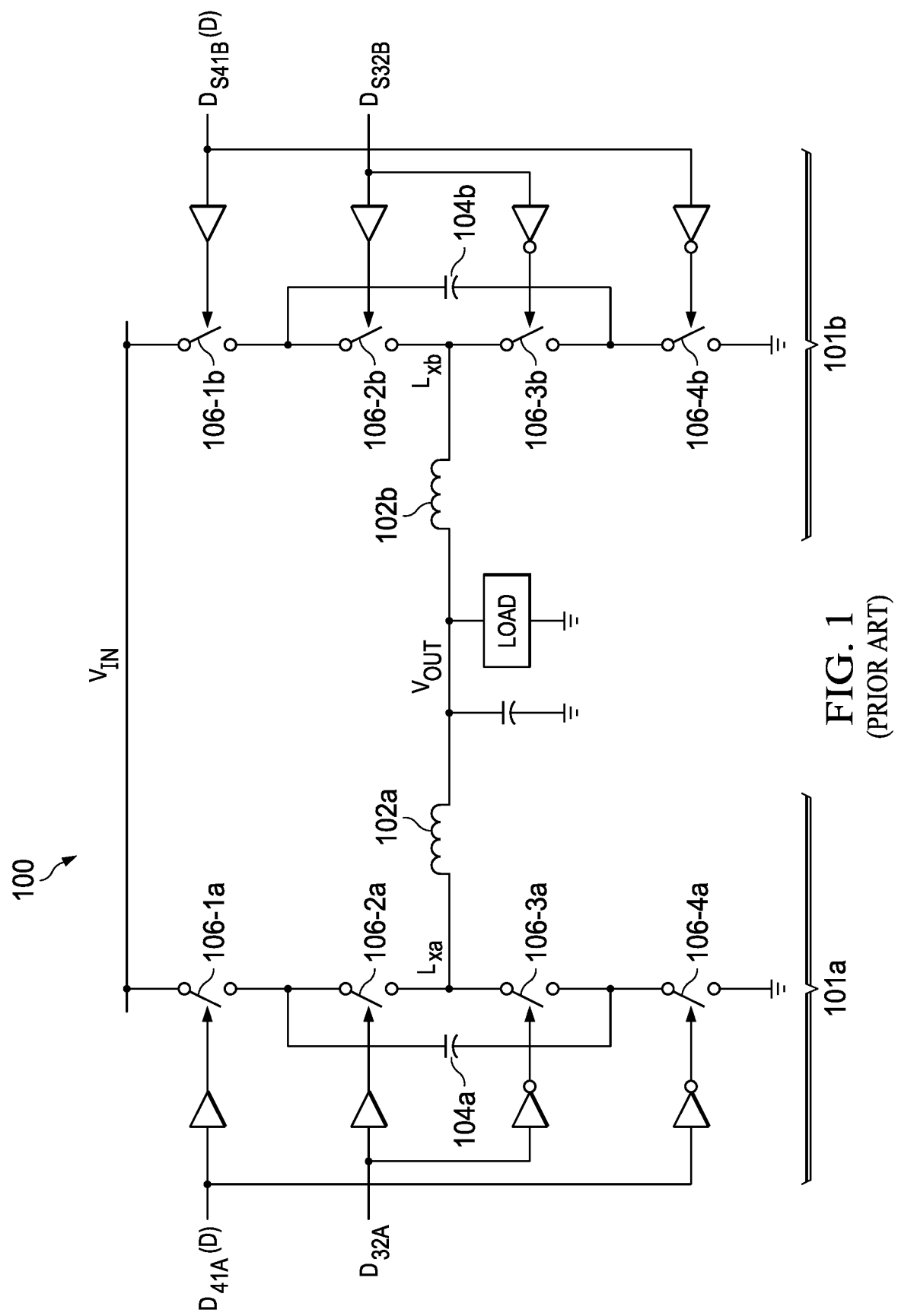
FIG. 1 illustrates a circuit diagram of selected components of an example two-phase 3-level buck converter, as is known in the art.
Figure 2A:
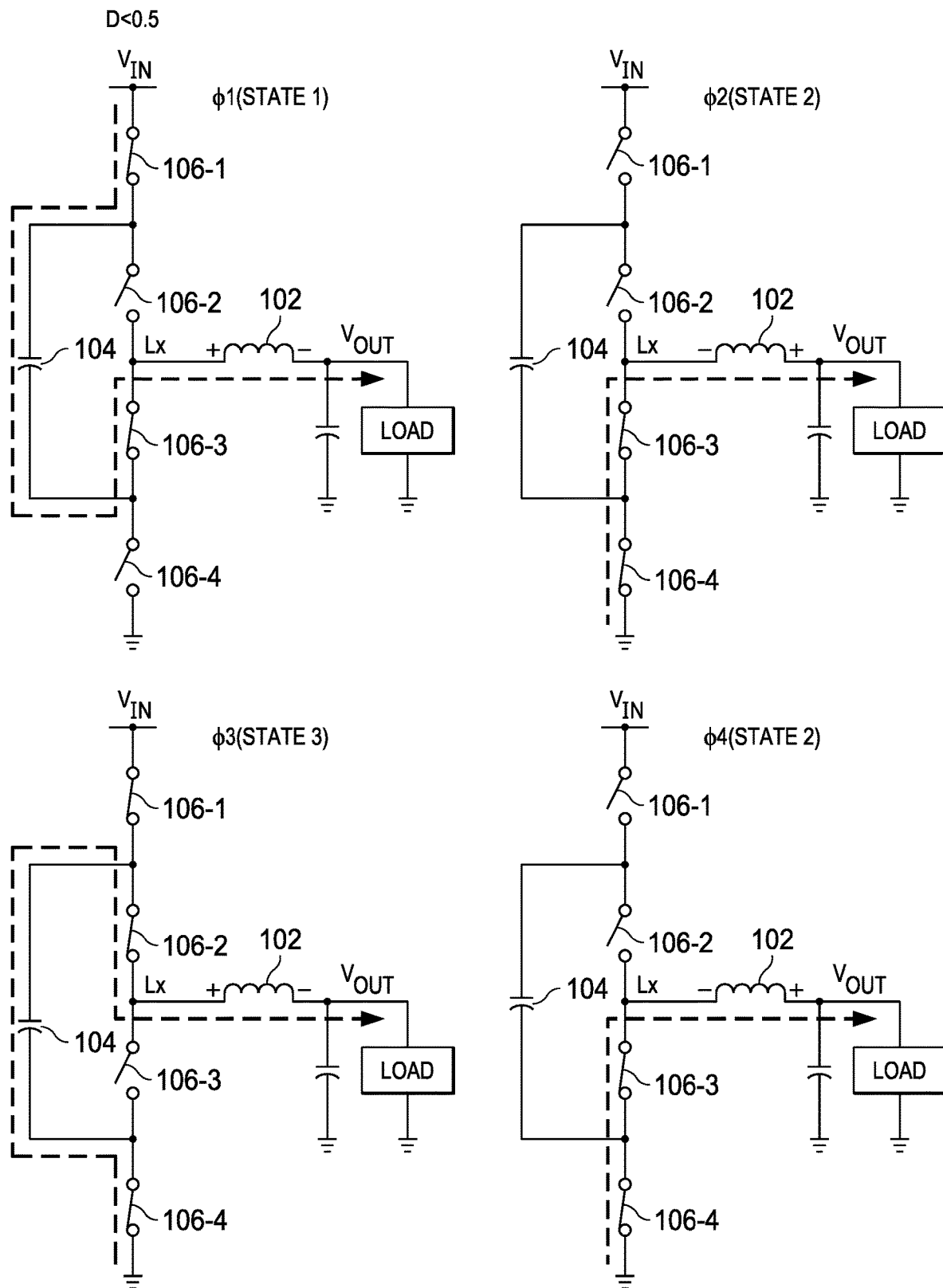
FIGS. 2A and 2B illustrate operation of the two-phase 3-level buck converter depicted in FIG. 1, as is known in the art.
Figure 2B:
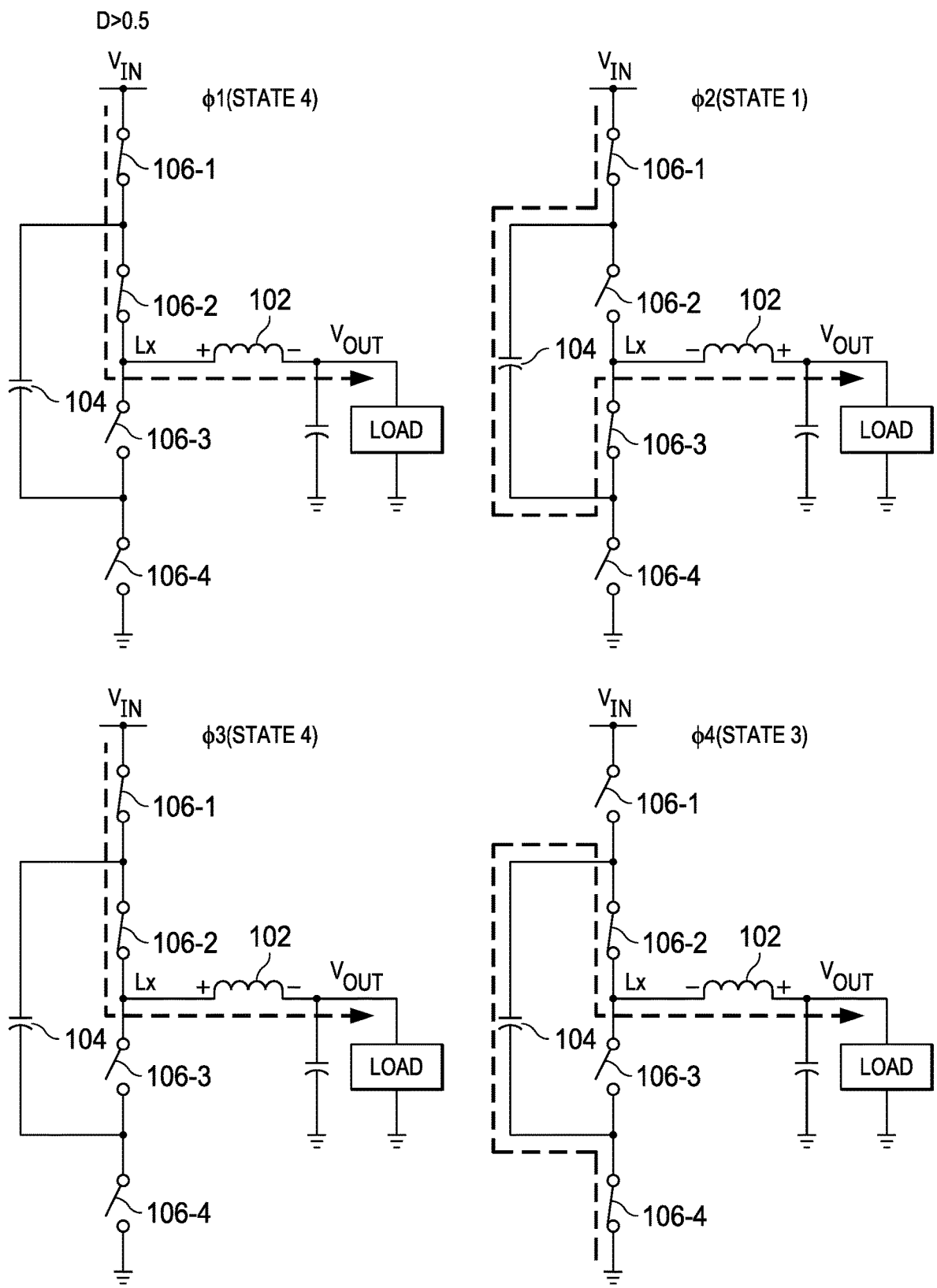
Figure 3A:
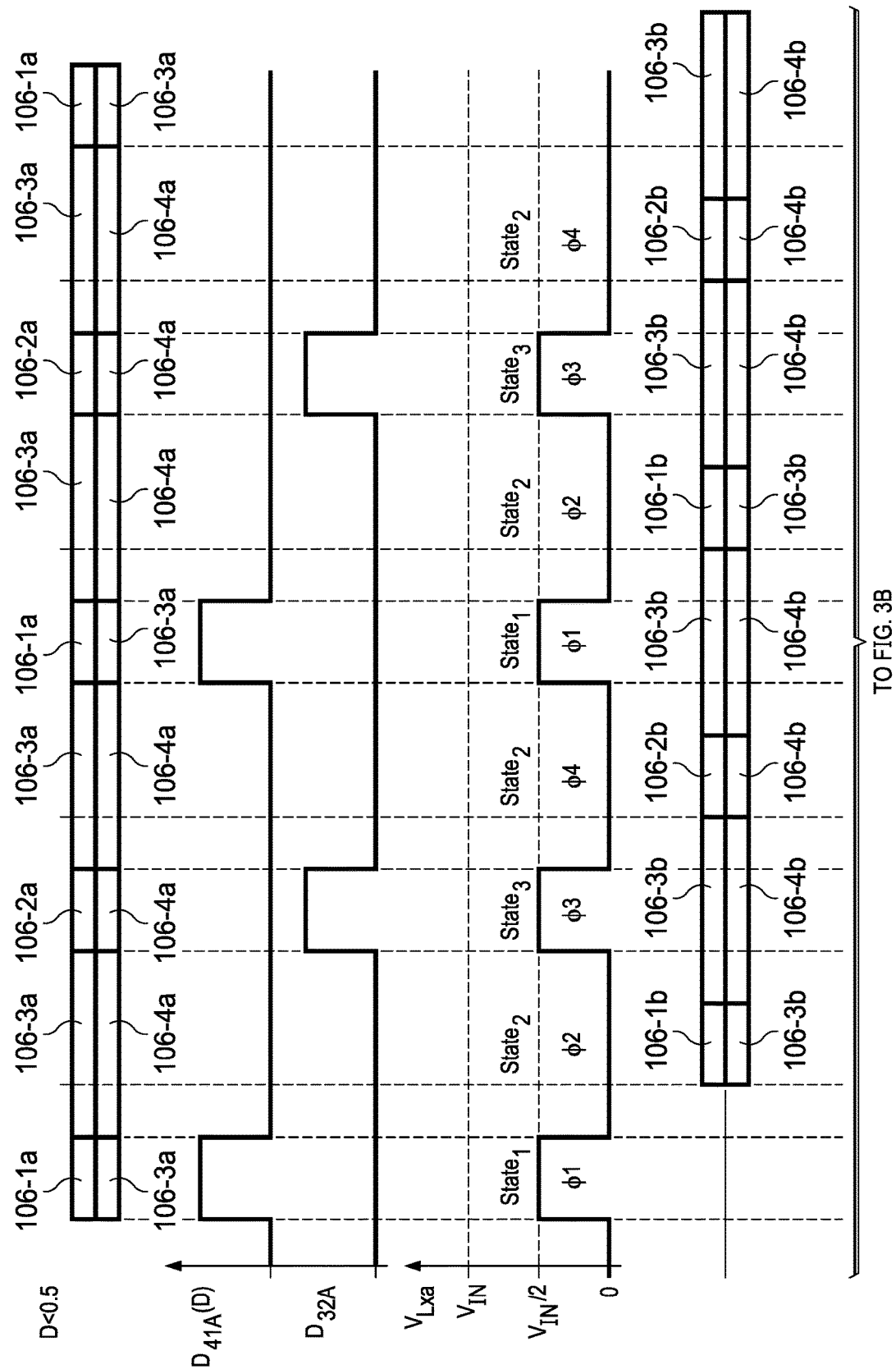
FIGS. 3A and 3B illustrate general two-phase operation of the two-phase 3-level buck converter depicted in FIG. 1 for duty cycles less than 0.5, as is known in the art.
Figure 3B:
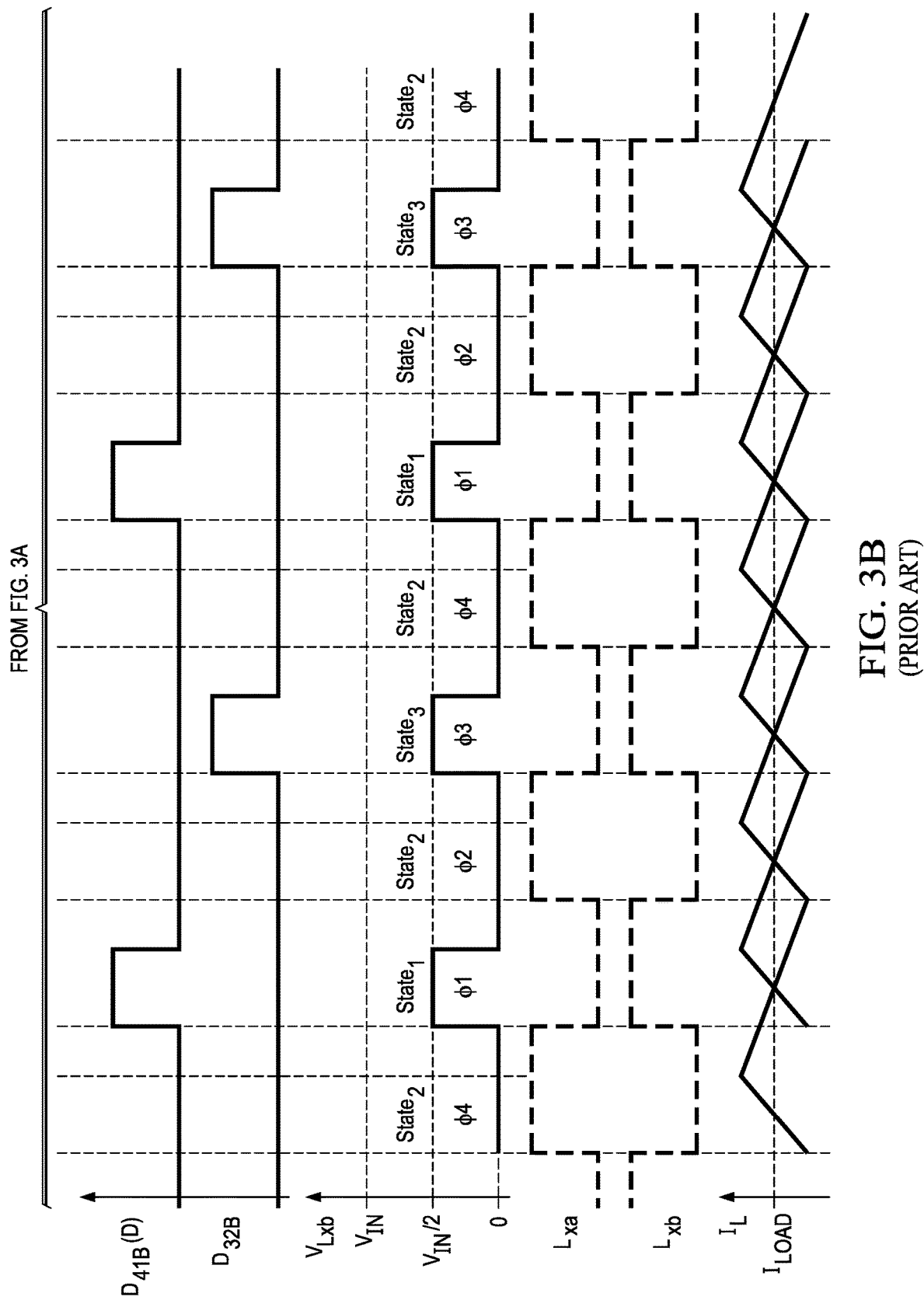
Figure 4A:
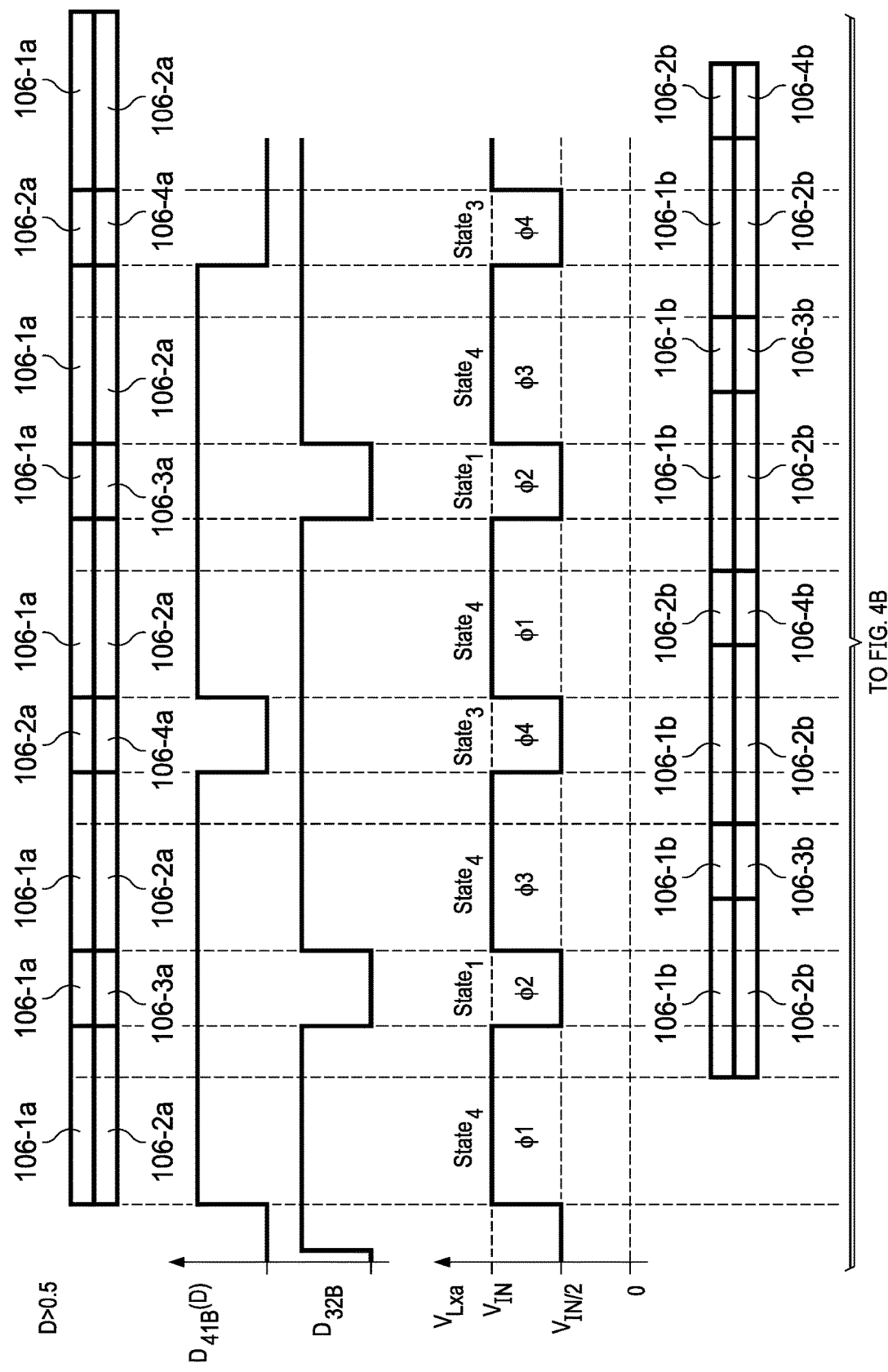
FIGS. 4A and 4B illustrate general two-phase operation of the two-phase 3-level buck converter depicted in FIG. 1 for duty cycles greater than 0.5, as is known in the art.
Figure 4B:
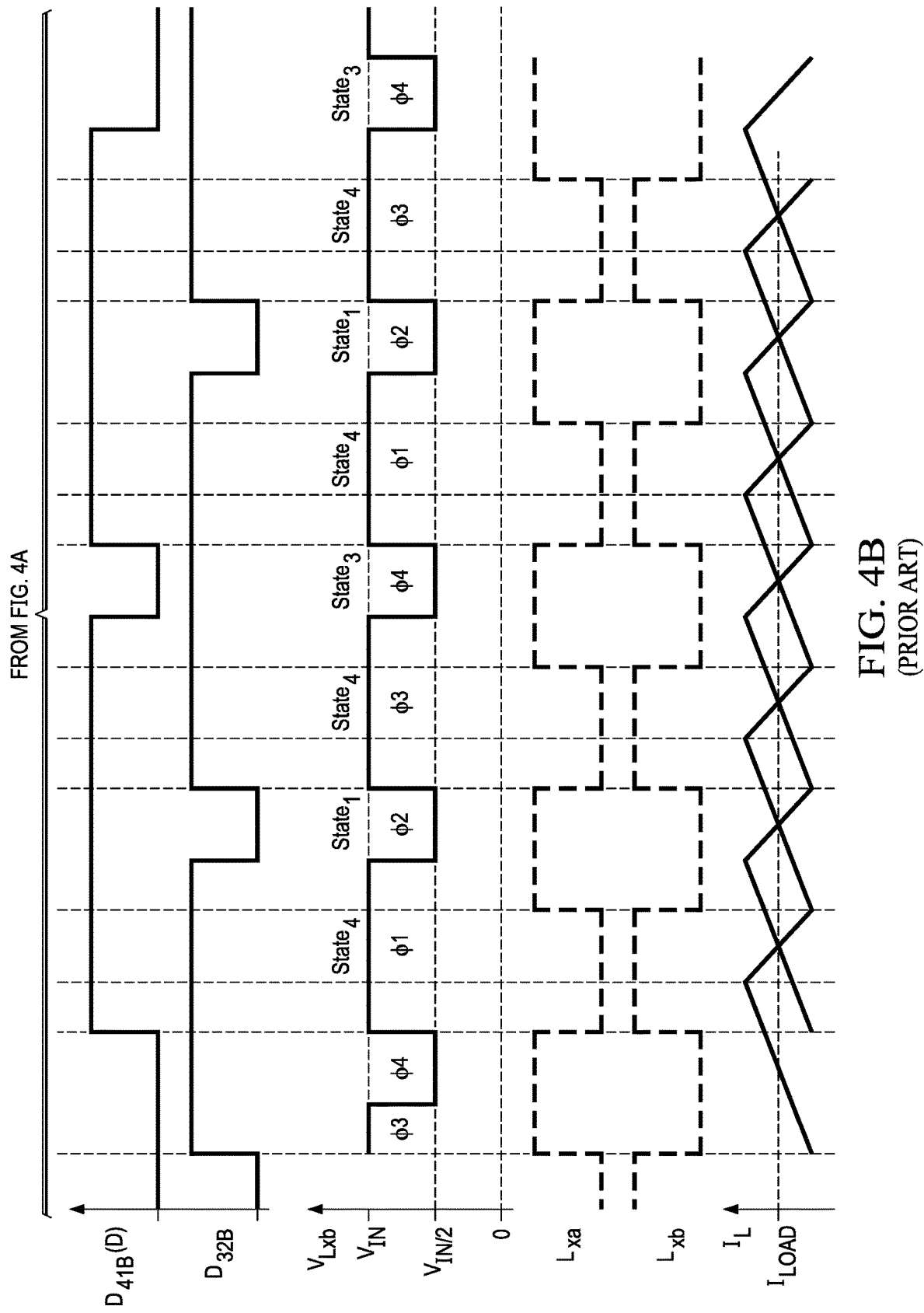

Perhaps most advantageously over the existing topology shown in FIG. 1, two-phase hybrid 3-level power converter 500 may be operated in numerous other modes.

Figure 11A:
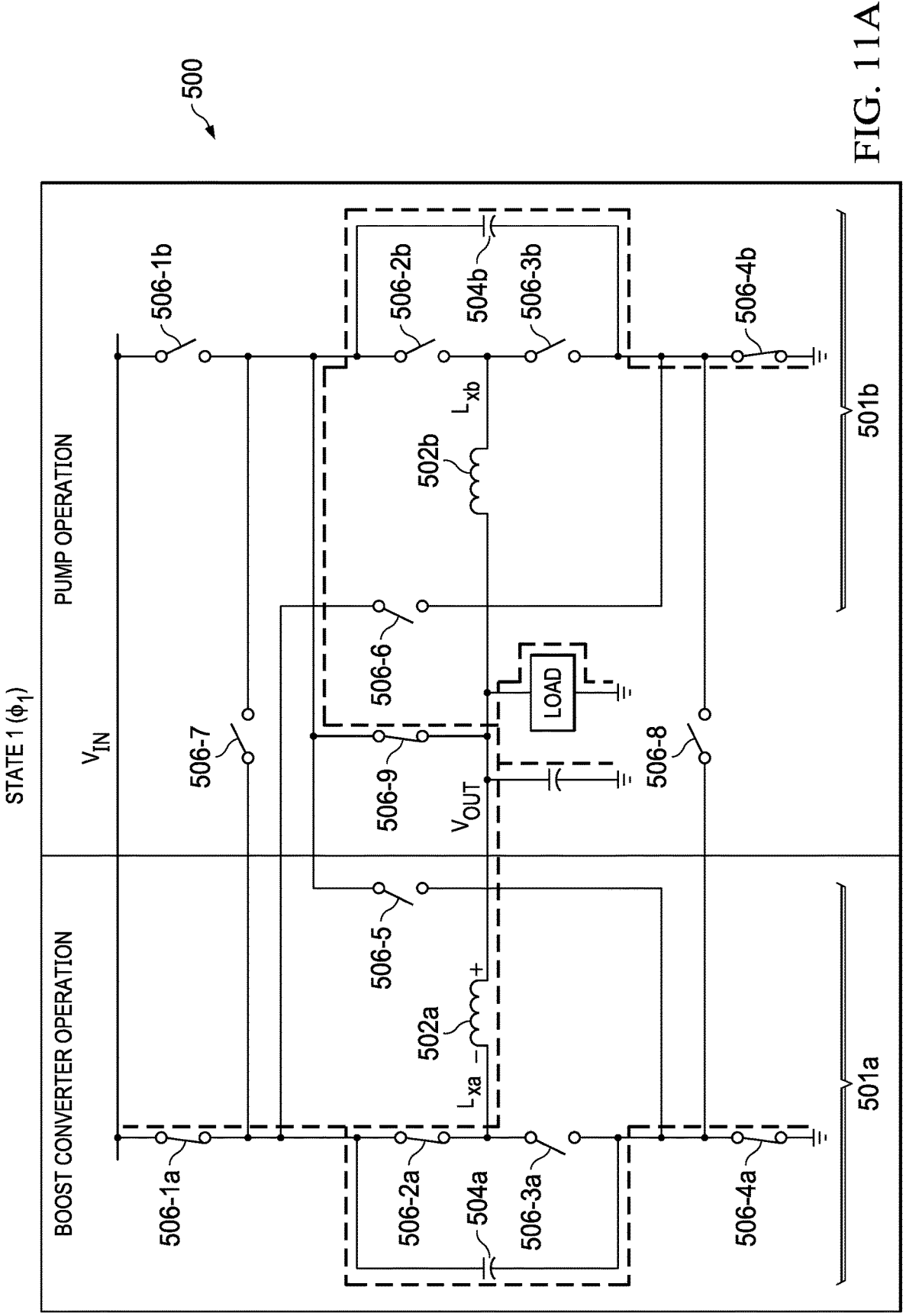
FIGS. 11A and 11B illustrate operation of the two-phase hybrid 3-level power converter depicted in FIG. 5 in a forward hybrid boost mode, in accordance with embodiments of the present disclosure.
Figure 11B:
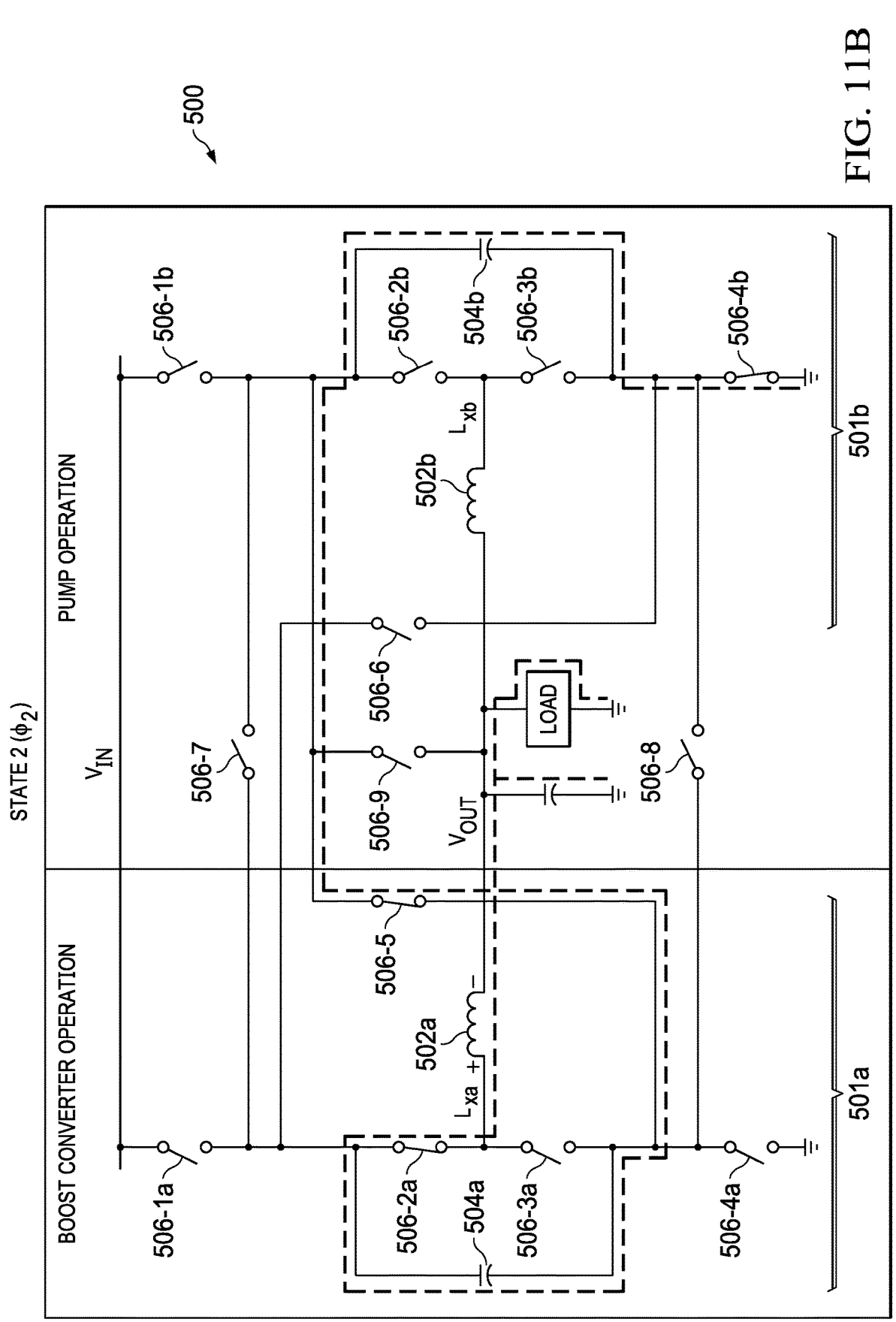

For example, FIGS. 11A and 11B illustrate operation of two-phase hybrid 3-level power converter 500 in a forward hybrid boost mode, in accordance with embodiments of the present disclosure. The forward hybrid boost mode may enable regulation of output voltage $V_{OUT}$ to a freely controlled target voltage greater than input voltage $V_{IN}$. As shown in FIGS. 11A and 11B, operation in the forward hybrid boost mode may include commutation of switches between a first state ($\varphi 1$) and a second state ($\varphi 2$). In the first state, switches 506-1a, 506-2a, and 506-4a may be activated (and switch 506-3a may be deactivated), such that flying capacitor 504a is charged to input voltage $V_{IN}$. Further in the first state, switches 506-9 and 506-4b may be activated, thus charging flying capacitor 504b to output voltage $V_{OUT}$. Thus, in the first state, inductor 502a may be in a demagnetizing phase. In the second state, switches 506-1a, 506-4a, and 506-9 may be deactivated, with switches 506-2a and 506-4b remaining activated. Further in the second state, switch 506-5 may be activated, coupling flying capacitors 504a and 504b in series, such that voltage $L_{xa}$ increases to $V_{OUT}+V_{IN}$. Thus, in the second state, inductor 502a may be in a magnetizing phase.

As shown in FIGS. 11A and 11B, in the boost operation described above, phase 501a may operate as a boost converter with phase 501b operating as a charge pump. In addition, it is understood that in some embodiments, switching in the boost mode of operation may be the dual of that described above, such that phase 501b may operate as a boost converter with phase 501a operating as a charge pump.

Figure 12A:
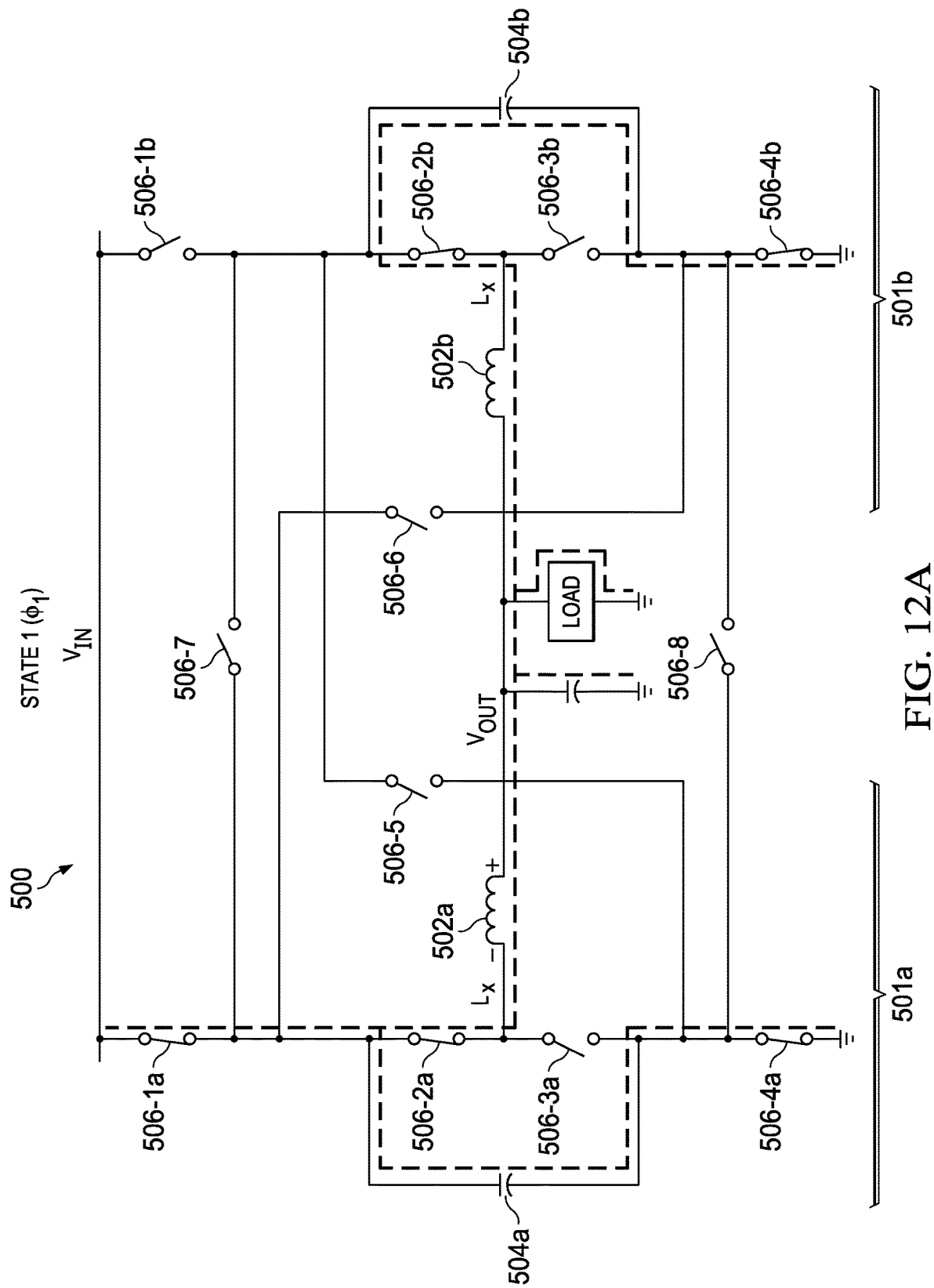
FIGS. 12A and 12B illustrate operation of a two-phase hybrid 3-level power converter in a forward hybrid boost mode using a different topology than that depicted in FIG. 5, in accordance with embodiments of the present disclosure.
Figure 12B:
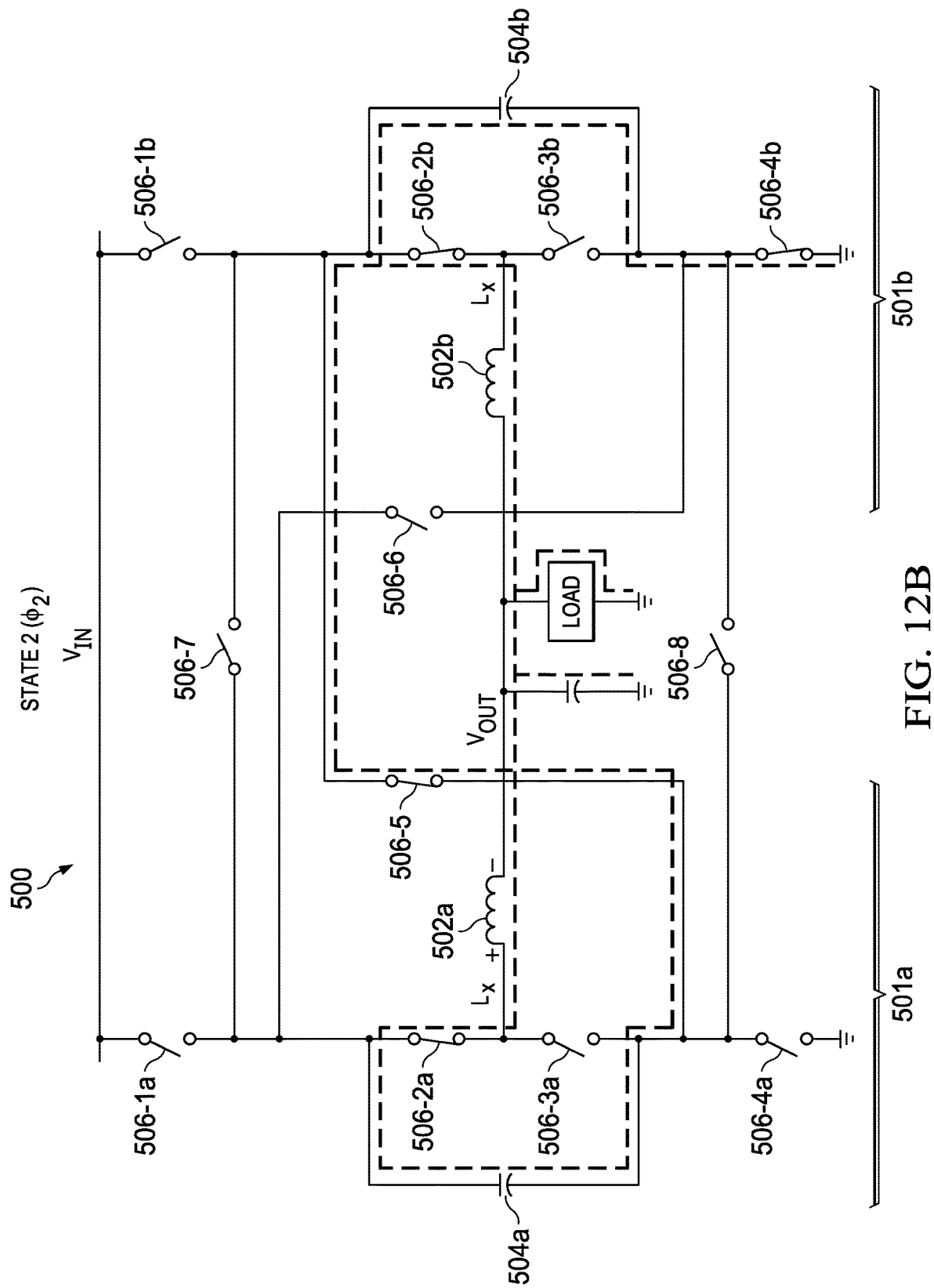

In embodiments in which a boost mode of operation is not needed or desired, two-phase hybrid 3-level power converter 500 may not include switch 506-9. In addition, embodiments of two-phase hybrid 3-level power converter 500 may exclude switch 506-9 but still enable a boost mode of operation. For example, as shown in FIGS. 12A and 12B, operation in the forward hybrid boost mode may include commutation of switches between a first state ($\varphi 1$) and a second state ($\varphi 2$). In the first state, switches 506-1a, 506-2a, and 506-4a may be activated (and switch 506-3a may be deactivated), such that flying capacitor 504a is charged to input voltage $V_{IN}$. Further in the first state, switches 506-2b and 506-4b may be activated. In the second state, switches 506-1a and 506-4a may be deactivated, with switches 506-2a, 506-2b, and 506-4b remaining activated. Further in the second state, switch 506-5 may be activated, coupling flying capacitors 504a and 504b in series, such that voltage $L_{xa}$ increases to $V_{OUT}+V_{IN}$. It is understood that in some embodiments, switching in the boost mode of operation may be the dual of that described in this paragraph.

Figure 13:
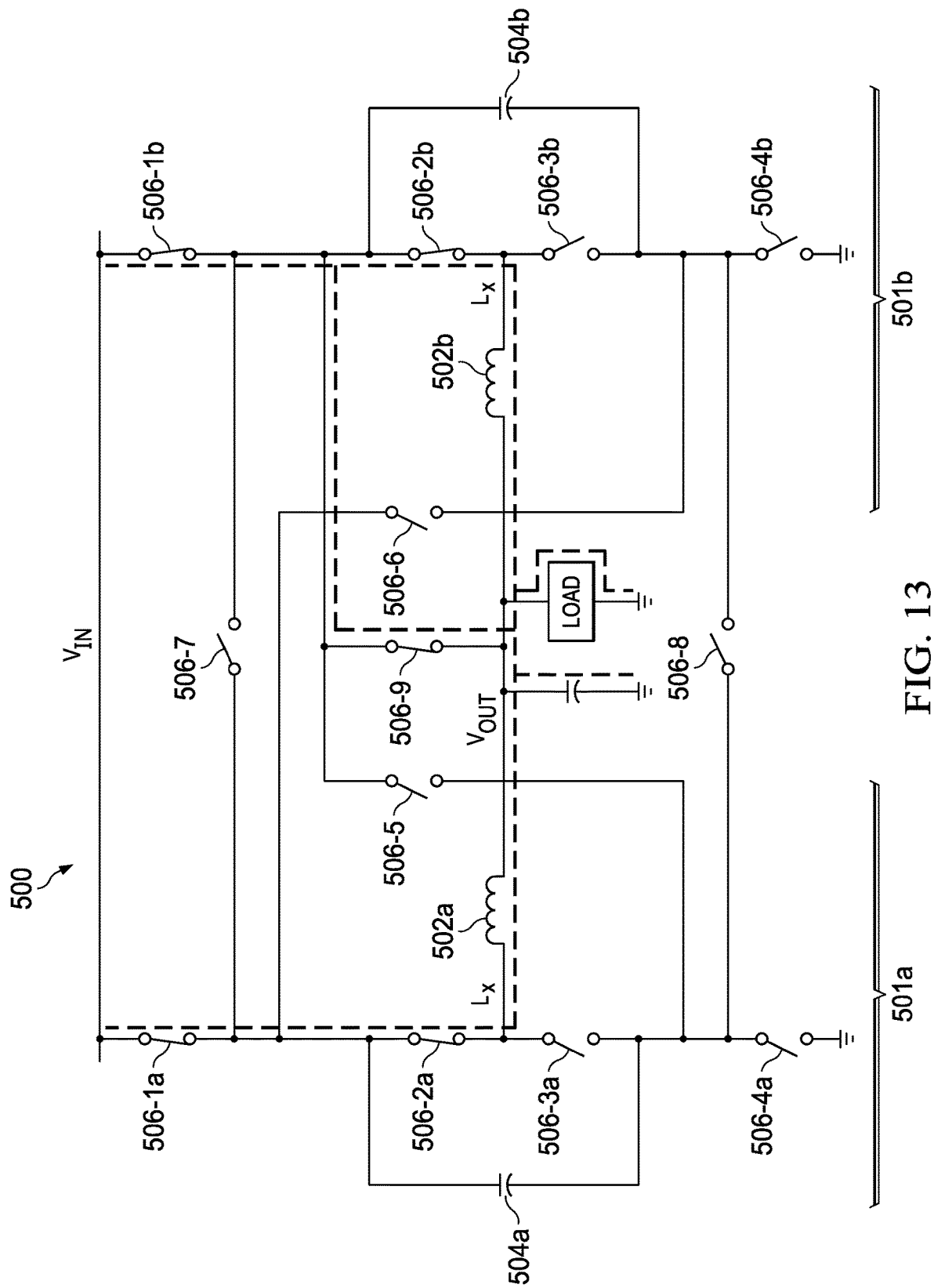
FIG. 13 illustrates operation of the two-phase hybrid 3-level power converter depicted in FIG. 5 in a bypass mode, in accordance with embodiments of the present disclosure.

In addition, two-phase hybrid 3-level power converter 500 may be operated in a bypass mode, depicted in FIG. 13, which bypasses input voltage $V_{IN}$ to output voltage $V_{OUT}$. In the bypass mode of operation, at least one of the following may be true through the entirety of operation in bypass mode:

Switches 506-1a and 506-2a remain activated;
  Switches 506-1b and 506-2b remain activated; and/or
  Switches 506-1b and 506-9 remain activated.

Although only one of the foregoing switching configurations may be present for operation in the bypass mode, in some instances it may be desirable that two or all three of these switching configurations be present during operation in the bypass mode, in order to minimize losses that may occur due to the resistances of power inductors 502a and 502b.

Figure 14A:
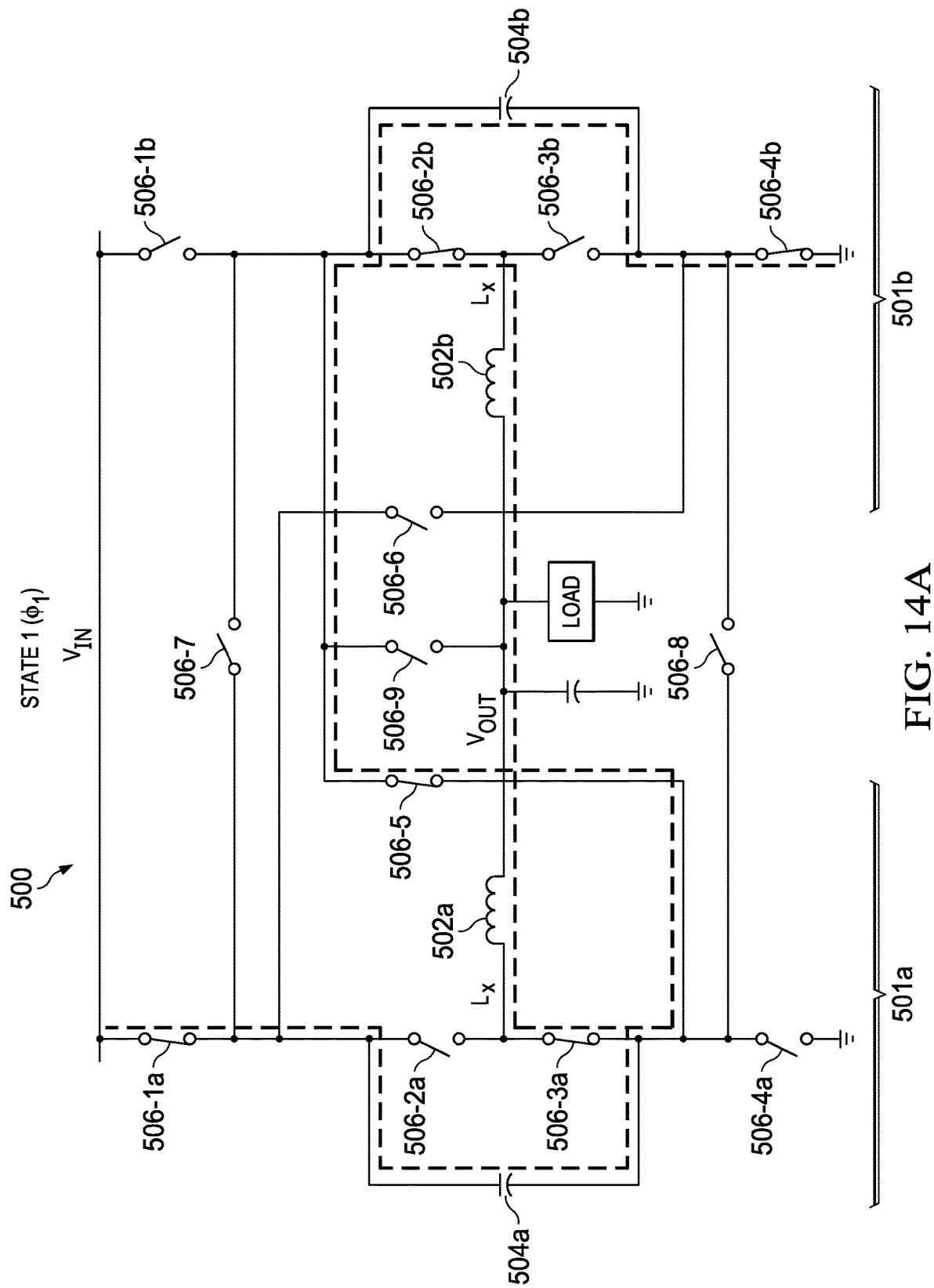
FIGS. 14A and 14B illustrate operation of the two-phase hybrid 3-level power converter depicted in FIG. 5 in a forward 2:1 switched capacitor mode, in accordance with embodiments of the present disclosure.
Figure 14B:
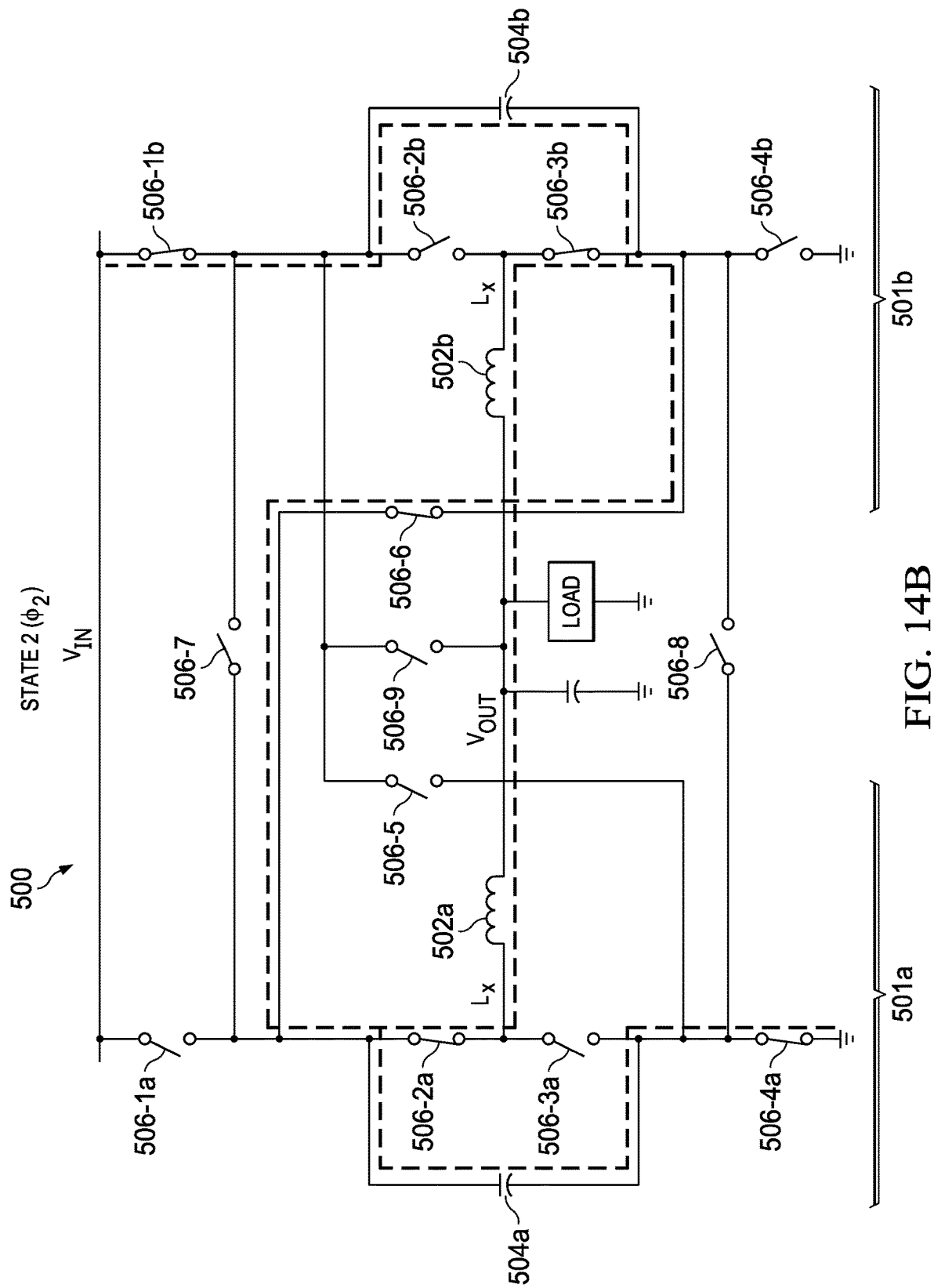

Further, two-phase hybrid 3-level power converter 500 may be operated in a forward 2:1 switched capacitor mode, depicted in FIGS. 14A and 14B, which may enable regulation of output voltage $V_{OUT}$ to $V_{IN}/2$. As shown in FIGS. 14A and 14B, operation in the forward 2:1 switched capacitor mode may include commutation of switches between a first state ($\varphi 1$) and a second state ($\varphi 2$). In the first state, switches 506-1a, 506-3a, 506-2b, 506-4b, and 506-5 may be activated. In the second state, switches 506-2a, 506-4a, 506-1b, 506-3b, and 506-6 may be activated. Balancing switch 506-5 may act to balance flying capacitors 504a and 504b in the first state, while balancing switch 506-6 may act to balance flying capacitors 504a and 504b in the second state.

Figure 15A:
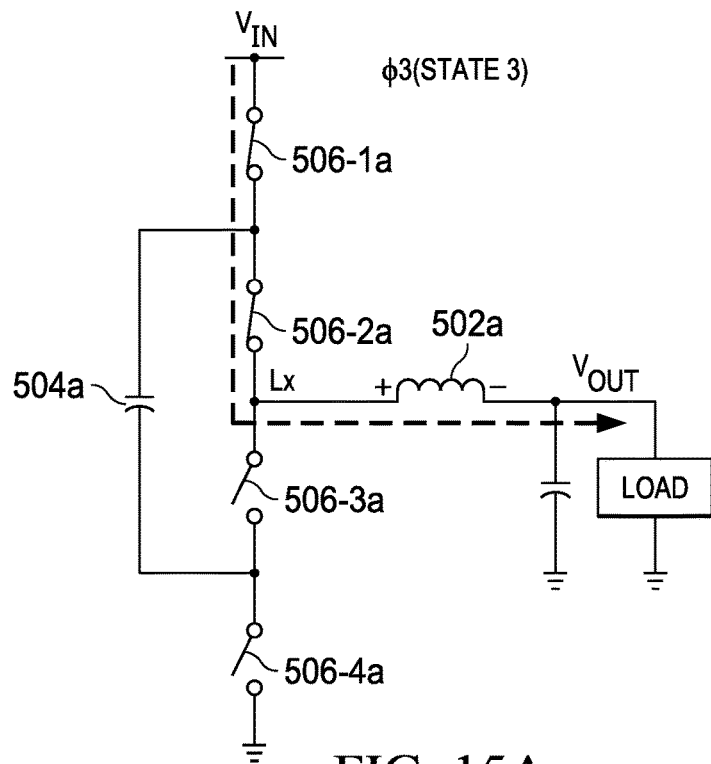
FIGS. 15A and 15B illustrate operation of a single phase of the two-phase hybrid 3-level power converter depicted in FIG. 5 in a forward 2-level buck mode, in accordance with embodiments of the present disclosure.
Figure 15B:
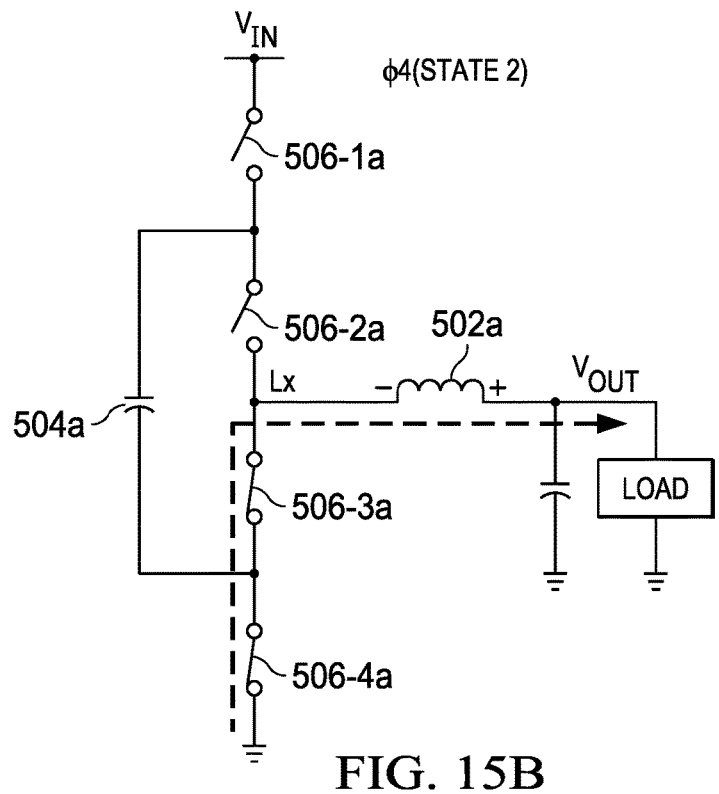

Moreover, two-phase hybrid 3-level power converter 500 may be operated in a forward 2-level buck mode, depicted in FIGS. 15A and 15B. As shown in FIGS. 15A and 15B, operation in the forward 2-level buck mode may include commutation of switches between a first state ($\varphi 1$) and a second state (φ2) by phase 501a. In the first state, switches 506-1a and 506-2a may be activated with switches 506-3a and 506-4a deactivated. In the second state, switches 506-3a and 506-4a may be activated with switches 506-1a and 506-2a deactivated. Phase 501b may operate in a similar switching sequence, but phase shifted 18-degrees relative to phase 501a. Notably, by swapping the input and output of two-phase hybrid 3-level power converter 500, two-phase hybrid 3-level power converter 500 may operate the same two phases depicted in FIG. 6 in order to operate in a reverse 2-level boost mode.

In some embodiments, certain components of two-phase hybrid 3-level power converter 500 may be formed within a single integrated circuit while other components may reside external to such integrated circuit. For example, in some embodiments, switches 506, as well as control circuitry for controlling switches 506, may reside on an integrated circuit, while power inductors 502 and flying capacitors 504 may reside external to such integrated circuit. As another example, flying capacitors 504, switches 506, and control circuitry for controlling switches 506, may reside on an integrated circuit, while power inductors 502 reside external to such integrated circuit.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A power converter for converting an input voltage at an input of the power converter into an output voltage at an output of the power converter, the power converter comprising:
   a plurality of phases including at least a first phase and a second phase, each of the plurality of phases comprising a plurality of switches and a flying capacitor comprising a first capacitor terminal and a second capacitor terminal; and
   balancing switches comprising:
      a first switch coupled between the second capacitor terminal of the first phase and the first capacitor terminal of the second phase;
      a second switch coupled between the first capacitor terminal of the second phase and the first capacitor terminal of the second phase;
      a third switch coupled between the first capacitor terminal of the first phase and the first capacitor terminal of the second phase; and
      a fourth switch coupled between the second capacitor terminal of the first phase and the second capacitor terminal of the second phase.

2. The power converter of claim 1, further comprising a control circuit configured to operate the power converter in a forward 3-level buck mode having a plurality of switching states, wherein:
   for at least a first one of the plurality of switching states, the first switch is activated to couple the flying capacitor of the first phase and the flying capacitor of the second phase in series;
   for at least a second one of the plurality of switching states, the second switch is activated to couple the flying capacitor of the first phase and the flying capacitor of the second phase in series; and
   for at least a third one of the plurality of switching states, one of the third switch and the fourth switch is activated to couple the flying capacitor of the first phase and the flying capacitor of the second phase in parallel.

3. The power converter of claim 1, further comprising a fifth switch coupled between the output and the first capacitor terminal of the second phase.

4. The power converter of claim 3, further comprising a control circuit configured to operate the power converter in a bypass mode wherein the fifth switch is activated.

5. A method for converting an input voltage at an input of the power converter into an output voltage at an output of the power converter, wherein:
- the power converter comprises:
  - a plurality of phases including at least a first phase and a second phase, each of the plurality of phases comprising a plurality of switches and a flying capacitor comprising a first capacitor terminal and a second capacitor terminal; and
  - balancing switches comprising:
    - a first switch coupled between the second capacitor terminal of the first phase and the first capacitor terminal of the second phase;
    - a second switch coupled between the first capacitor terminal of the second phase and the first capacitor terminal of the second phase;
    - a third switch coupled between the first capacitor terminal of the first phase and the first capacitor terminal of the second phase; and
    - a fourth switch coupled between the second capacitor terminal of the first phase and the second capacitor terminal of the second phase; and
- the method comprises operating the power converter in a forward 3-level buck mode having a plurality of switching states, wherein:
  - for at least a first one of the plurality of switching states, the first switch is activated to couple the flying capacitor of the first phase and the flying capacitor of the second phase in series;
  - for at least a second one of the plurality of switching states, the second switch is activated to couple the flying capacitor of the first phase and the flying capacitor of the second phase in series; and
  - for at least a third one of the plurality of switching states, one of the third switch and the fourth switch is activated to couple the flying capacitor of the first phase and the flying capacitor of the second phase in parallel.

6. The method of claim 5, wherein the power converter further comprises a fifth switch coupled between the output and the first capacitor terminal of the second phase.

7. The method of claim 6, further comprising operating the power converter in a bypass mode wherein the fifth switch is activated.

8. An integrated circuit for use in a power converter for converting an input voltage at an input of the integrated circuit into an output voltage at an output of the power converter, the integrated circuit comprising:
- a plurality of phases including at least a first phase and a second phase, each of the plurality of phases comprising a plurality of switches and a flying capacitor comprising a first capacitor terminal and a second capacitor terminal; and
- balancing switches comprising:
  - a first switch coupled between the second capacitor terminal of the first phase and the first capacitor terminal of the second phase;
  - a second switch coupled between the first capacitor terminal of the second phase and the first capacitor terminal of the second phase;
  - a third switch coupled between the first capacitor terminal of the first phase and the first capacitor terminal of the second phase; and
  - a fourth switch coupled between the second capacitor terminal of the first phase and the second capacitor terminal of the second phase.

9. The integrated circuit of claim 8, further comprising a control circuit configured to operate the power converter in a forward 3-level buck mode having a plurality of switching states, wherein:
- for at least a first one of the plurality of switching states, the first switch is activated to couple the flying capacitor of the first phase and the flying capacitor of the second phase in series;
- for at least a second one of the plurality of switching states, the second switch is activated to couple the flying capacitor of the first phase and the flying capacitor of the second phase in series; and
- for at least a third one of the plurality of switching states, one of the third switch and the fourth switch is activated to couple the flying capacitor of the first phase and the flying capacitor of the second phase in parallel.

10. The integrated circuit of claim 8, further comprising a fifth switch coupled between the output and the first capacitor terminal of the second phase.

11. The integrated circuit of claim 10, further comprising a control circuit configured to operate the power converter in a bypass mode wherein the fifth switch is activated.

* * * * *